US012807328B2

(12) United States Patent
Mackie et al.

(10) Patent No.: US 12,807,328 B2
(45) Date of Patent: Nov. 24, 2026

(54) AUGMENTED REALITY SYSTEM FOR AIRCRAFT PILOTS USING THIRD PARTY DATA

(71) Applicant: Red Six Aerospace Inc., Orlando, FL (US)

(72) Inventors: Thomas Mackie, Santa Monica, CA (US); Max M. Marosko, III, Coupland, TX (US); Daniel Augustine Robinson, Marina Del Rey, CA (US)

(73) Assignee: RED SIX AEROSPACE INC, Orlando, FL (US)

( * ) Notice: Subject to any disclaimer, the term of this patent is extended or adjusted under 35 U.S.C. 154(b) by 0 days.

(21) Appl. No.: 18/623,825

(22) Filed: Apr. 1, 2024

(65) Prior Publication Data

US 2024/0327027 A1 Oct. 3, 2024

Related U.S. Application Data

(60) Provisional application No. 63/456,117, filed on Mar. 31, 2023.

(51) Int. Cl.
*B64D 43/00* (2006.01)
*G09G 3/00* (2006.01)

(52) U.S. Cl.
CPC ............ *B64D 43/00* (2013.01); *G09G 3/001* (2013.01); *G09G 2380/12* (2013.01)

(58) Field of Classification Search
CPC .... B64D 43/00; G09G 3/001; G09G 2380/12; G06F 3/011-013
See application file for complete search history.

(56) References Cited

U.S. PATENT DOCUMENTS 4,214,381 A 7/1980 Clark
5,838,262 A 11/1998 Kershner
6,826,458 B2 11/2004 Horvath
(Continued)

FOREIGN PATENT DOCUMENTS

WO 2020190380 9/2020

OTHER PUBLICATIONS

Awe, "ThinVR: A compact, 180 degree FOV, VR display" youtube video recorded at AWE Online 2020, retrieved from <<https://www.youtube.com/watch?v=t9JW_00CoQ0>> on Jun. 26, 2023.
(Continued)

*Primary Examiner* — Hang Lin
(74) *Attorney, Agent, or Firm* — FisherBroyles LLP

(57) ABSTRACT

An augmented reality system for a pilot in a cockpit of an aircraft, said aircraft having a geospatial location, altitude and attitude at a given moment, said system comprising: (a) a display for displaying a visual environment outside of the aircraft augmented with virtual content; (b) a computer content presentation system for generating virtual content based on an object not in said visual environment, and causing a representation of said virtual content to be displayed on said display; (c) wherein said virtual content comprises at least geospatial location of said object; (d) wherein said representation of said virtual content is displayed on said display relative to at least said aircraft's location, altitude, and attitude at said given moment; and (e) wherein said object is based on third party data.

19 Claims, 12 Drawing Sheets

(56) References Cited

U.S. PATENT DOCUMENTS

| | | | | |
|---|---|---|---|---|
| 6,952,630 | B2 | 10/2005 | Hedrick | |
| 8,463,463 | B1 | 6/2013 | Feldmann | |
| 8,686,900 | B2 | 4/2014 | Whitehead | |
| 9,099,009 | B2 | 8/2015 | Sowadski | |
| 9,434,226 | B1 | 9/2016 | Trigo | |
| 10,025,096 | B2 | 7/2018 | Yoon | |
| 10,204,453 | B2 | 2/2019 | Sharma | |
| 10,254,544 | B1 | 4/2019 | Melzer | |
| 10,528,126 | B2 | 1/2020 | Trythall | |
| 10,585,471 | B2 | 3/2020 | Reichow | |
| 10,713,960 | B1 | 7/2020 | Ziarnick | |
| 10,822,108 | B2 | 11/2020 | Chavez | |
| 10,827,165 | B2 | 11/2020 | Ratcliff | |
| 10,884,525 | B1 | 1/2021 | Vonsik | |
| 10,948,740 | B2 | 3/2021 | Ratcliff | |
| 10,977,493 | B2 | 4/2021 | Speasl | |
| 10,996,473 | B2 | 5/2021 | Yang | |
| 11,023,515 | B2 | 6/2021 | William | |
| 11,601,638 | B2 | 3/2023 | Ratcliff | |
| 2002/0015195 | A1 | 2/2002 | Sugano | |
| 2002/0053983 | A1 | 5/2002 | Chamas | |
| 2002/0061804 | A1 | 5/2002 | Hasegawa | |
| 2002/0115043 | A1 | 8/2002 | Baker | |
| 2003/0025714 | A1 | 2/2003 | Ebersole | |
| 2005/0231419 | A1 | 10/2005 | Mitchell | |
| 2006/0146048 | A1 | 7/2006 | Wright | |
| 2006/0178758 | A1 | 8/2006 | Koriat | |
| 2006/0181483 | A1 | 8/2006 | Ari | |
| 2006/0271249 | A1 | 11/2006 | Testrake | |
| 2007/0005199 | A1 | 1/2007 | He | |
| 2007/0009862 | A1 | 1/2007 | Quinn | |
| 2008/0284864 | A1 | 11/2008 | Kotake | |
| 2008/0300730 | A1 | 12/2008 | Cleary | |
| 2008/0319647 | A1 | 12/2008 | Dehn | |
| 2009/0112813 | A1 | 4/2009 | Jung | |
| 2009/0112817 | A1 | 4/2009 | Jung | |
| 2009/0113298 | A1 | 4/2009 | Jung | |
| 2010/0096491 | A1 | 4/2010 | Whitelaw | |
| 2010/0125412 | A1* | 5/2010 | Suddreth | G01C 23/00 340/980 |
| 2010/0279255 | A1 | 11/2010 | Williams, II | |
| 2010/0283635 | A1 | 11/2010 | Brinkman | |
| 2010/0295754 | A1 | 11/2010 | Cernasov | |
| 2010/0313146 | A1 | 12/2010 | Nielsen | |
| 2011/0106447 | A1 | 5/2011 | Wise | |
| 2011/0183301 | A1 | 7/2011 | Turner | |
| 2011/0192241 | A1 | 8/2011 | Aiki | |
| 2012/0156653 | A1 | 6/2012 | Wokurka | |
| 2012/0176497 | A1 | 7/2012 | Shadmi | |
| 2012/0282588 | A1 | 11/2012 | Stevens | |
| 2012/0287040 | A1 | 11/2012 | Moore | |
| 2012/0301853 | A1 | 11/2012 | Garvis | |
| 2012/0303252 | A1 | 11/2012 | Schwinn | |
| 2013/0002525 | A1 | 1/2013 | Foote | |
| 2013/0038510 | A1 | 2/2013 | Brin | |
| 2013/0050070 | A1 | 2/2013 | Lewis | |
| 2013/0162632 | A1 | 6/2013 | Varga | |
| 2013/0238198 | A1 | 9/2013 | Prentice | |
| 2013/0280678 | A1 | 10/2013 | Towers | |
| 2014/0080099 | A1 | 3/2014 | Sowadski | |
| 2014/0127655 | A1 | 5/2014 | Taylor | |
| 2014/0152792 | A1 | 6/2014 | Krueger | |
| 2014/0306866 | A1 | 10/2014 | Miller | |
| 2015/0187224 | A1 | 7/2015 | Moncrief | |
| 2015/0234455 | A1 | 8/2015 | Lavalle | |
| 2015/0294505 | A1 | 10/2015 | Atsmon | |
| 2015/0346722 | A1 | 12/2015 | Herz | |
| 2016/0019808 | A1 | 1/2016 | Chavez | |
| 2016/0027336 | A1 | 1/2016 | Towers | |
| 2016/0165409 | A1 | 6/2016 | Bulut | |
| 2016/0188857 | A1 | 6/2016 | Semba | |
| 2016/0195923 | A1 | 7/2016 | Nauseef | |
| 2016/0293133 | A1 | 10/2016 | Dutt | |
| 2017/0030735 | A1 | 2/2017 | Mohideen | |
| 2017/0064157 | A1 | 3/2017 | Lawrence | |
| 2017/0069214 | A1 | 3/2017 | Dupray | |
| 2017/0109562 | A1 | 4/2017 | Shroff | |
| 2017/0139205 | A1 | 5/2017 | Lee | |
| 2017/0186240 | A1 | 6/2017 | Alaniz | |
| 2017/0262052 | A1 | 9/2017 | Richmond | |
| 2017/0287342 | A1* | 10/2017 | Hodge | G09G 5/377 |
| 2017/0308157 | A1 | 10/2017 | Tsuda | |
| 2018/0096532 | A1 | 4/2018 | Srivastav | |
| 2018/0130260 | A1 | 5/2018 | Schmirler | |
| 2018/0155052 | A1 | 6/2018 | Lacroix | |
| 2018/0190095 | A1 | 7/2018 | Leegate | |
| 2018/0253856 | A1 | 9/2018 | Price | |
| 2018/0272231 | A1 | 9/2018 | Katoh | |
| 2018/0293909 | A1 | 10/2018 | Lechner | |
| 2019/0035258 | A1 | 1/2019 | Zhang | |
| 2019/0101976 | A1 | 4/2019 | Reichow | |
| 2019/0102928 | A1 | 4/2019 | Blackshaw | |
| 2019/0212158 | A1 | 7/2019 | Gordon | |
| 2019/0215671 | A1 | 7/2019 | Takii | |
| 2019/0228590 | A1 | 7/2019 | Kaifosh | |
| 2019/0317718 | A1 | 10/2019 | George | |
| 2019/0333404 | A1 | 10/2019 | Bicanic | |
| 2020/0151958 | A1 | 5/2020 | Livneh | |
| 2021/0049925 | A1 | 2/2021 | Robinson | |
| 2021/0103340 | A1 | 4/2021 | Bradski | |
| 2021/0201600 | A1 | 7/2021 | Ghanbari | |
| 2022/0051585 | A1* | 2/2022 | Robinson | G09B 9/302 |
| 2022/0108623 | A1 | 4/2022 | Robinson | |
| 2022/0114906 | A1* | 4/2022 | Landers | G09B 9/307 |
| 2022/0217322 | A1 | 7/2022 | Alfaro | |
| 2023/0264108 | A1 | 8/2023 | Casper | |
| 2025/0208619 | A1* | 6/2025 | Frey | G05D 1/2247 |

OTHER PUBLICATIONS

International Search Report and Written Opinion of the International Search Authority mailed Oct. 19, 2022, in International Application No. PCT/US22/27665, 17 pages.

International Search Report and Written Opinion of the International Searching Authority mailed Jul. 16, 2024, in International Application No. PCT/US24/22519.

International Search Report mailed Dec. 17, 2021, in International Application No. PCT/US2021/057357, 3 pages.

Michael William Gillen; A Study Evaluating if Targeted Training for Startle Effect can Improve Pilot Reactions in Handling U Unexpected Situations in a Flight Simulator; The University of North Dakota. ProQuest Dissertations Publishing, Dec. 1, 2016 (Year: 2016) 155 pages.

Qllin Krum, Ordinary Pilots Are Closer to Getting Fighter Jet-Like Augmented Reality Displays, Aug. 31, 2015, Jalopnik {htlps:// jalopnik com/general-aviation-pilots-closer-to-getting-fighter-jet-1-1722914390) 8 pages.

Written Opinion of the International Searching Authority mailed Dec. 17, 2021, in International Application No. PCT/US2021/057357, 9 pages.

Extended European Search Report mailed Sep. 8, 2025, in European Application No. 22799507.3 (pp. 1-15).

* cited by examiner

AUGMENTED REALITY SYSTEM FOR AIRCRAFT PILOTS USING THIRD PARTY DATA

CROSS REFERENCE TO RELATED APPLICATIONS

The present patent application claims the benefit of U.S. Provisional Patent Application 63/456,117, filed Mar. 31, 2023, the entire disclosures of each of which are hereby incorporated by reference.

FIELD OF INVENTION

The present disclosure relates, generally, to an augmented reality system and method for aircraft pilots, and, more specifically, to an augmented reality system and method for aircraft pilots using third party data.

BACKGROUND OF INVENTION

Display devices are used for various types of training, such as in simulators. Such display devices may display virtual reality and augmented reality content.

Therefore, there is a need for improved methods, systems, apparatuses and devices for facilitating provisioning of a virtual experience that may overcome one or more of the above-mentioned problems and/or limitations.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

An augmented reality system for a pilot in a cockpit of an aircraft, said aircraft having a geospatial location, altitude and attitude and a given moment, said system comprising: (a) a display for displaying a visual environment outside of the aircraft augmented with virtual content; (b) a computer content presentation system for generating virtual content based on an object not in said visual environment, and causing a representation of said virtual content to be displayed on said display; (c) wherein said virtual content comprises at least geospatial location of said object; (d) wherein said representation of said virtual content is displayed on said display relative to at least said aircraft's location, altitude, and attitude at said given moment; and (e) wherein said object is based on third party data.

A method of enhancing a view of a pilot using augmented reality, said pilot being in a cockpit of an aircraft, said aircraft having a geospatial location, altitude and attitude at a given moment, said method comprising: (a) displaying a visual environment outside of the aircraft augmented with virtual content; (b) generating said virtual content based on an object not in said visual environment, and causing a representation of said virtual content to be displayed on said display; (c) wherein said virtual content comprises at least geospatial location of said object; (d) wherein said representation of said virtual content is displayed on said display relative to at least said aircraft's location, altitude, and attitude at said given moment; and (e) wherein said object is based on third party data.

An augmented reality system for a pilot in a cockpit of an aircraft, said aircraft having a geospatial location, altitude and attitude and a given moment, said system comprising: (a) a display for displaying a visual environment outside of the aircraft augmented with virtual content; (b) a computer content presentation system for generating virtual content based on an object not in said visual environment, and causing a representation of said virtual content to be displayed on said display; (c) wherein said virtual content comprises at least geospatial location of said object; (d) wherein said representation of said virtual content is displayed on said display relative to at least said aircraft's location, altitude, and attitude at said given moment; (e) wherein said object is a virtual landing platform (e.g., virtual aircraft carrier landing deck).

A method of training a pilot using augmented reality, said pilot being in a cockpit of an aircraft, said aircraft having a geospatial location, altitude and attitude at a given moment, said method comprising: (a) displaying a visual environment outside of the aircraft augmented with virtual content; (b) generating said virtual content based on an object not in said visual environment, and causing a representation of said virtual content to be displayed on said display; (c) wherein said virtual content comprises at least geospatial location of said object; (d) wherein said representation of said virtual content is displayed on said display relative to at least said aircraft's location, altitude, and attitude at said given moment; and (e) wherein said object is a virtual landing platform (e.g., an aircraft landing deck).

SUMMARY OF FIGURES

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION

Figure 1:
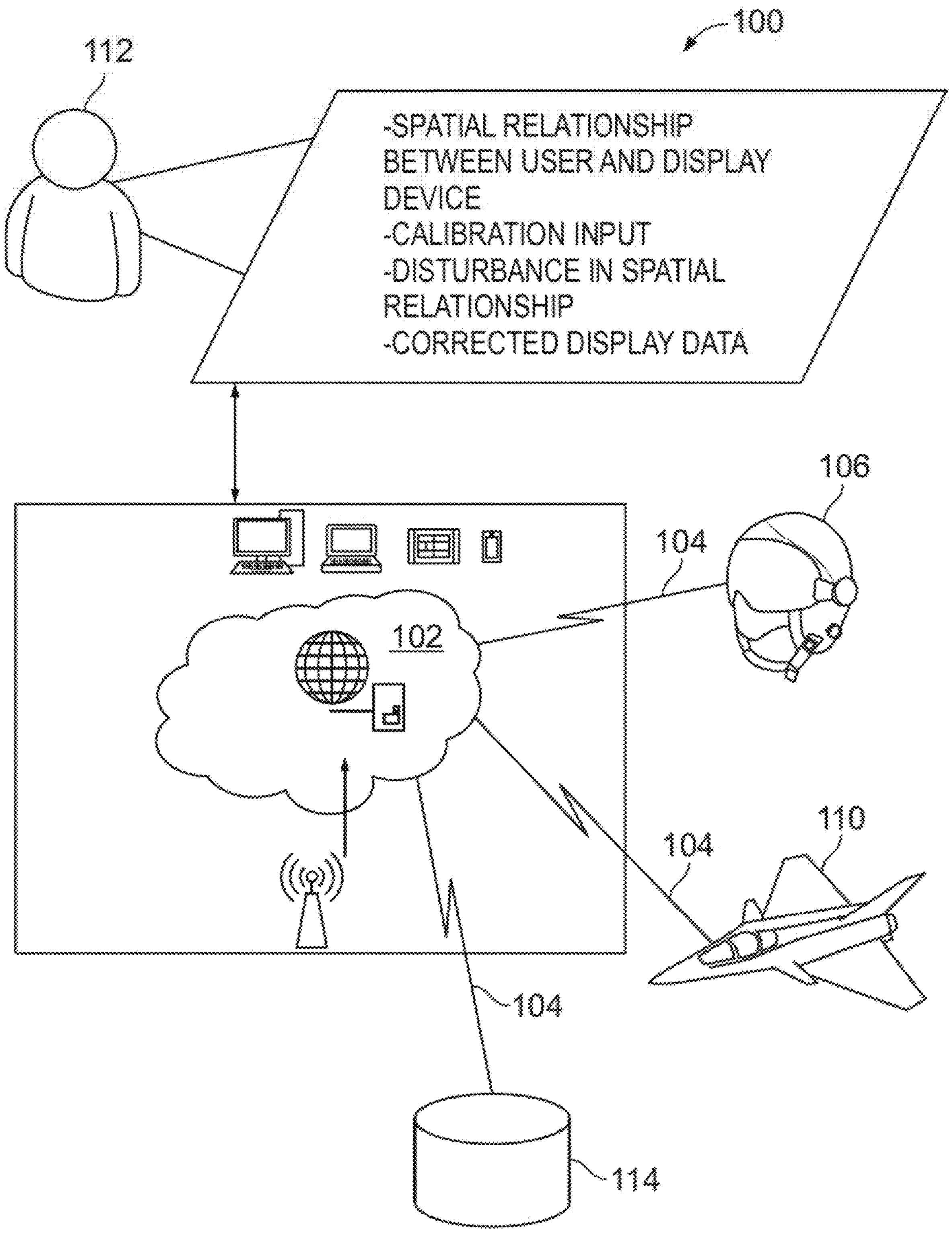
FIG. 1 is an illustration of an online platform consistent with various embodiments of the present disclosure.

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of facilitating provisioning of a virtual experience, embodiments of the present disclosure are not limited to use only in this context.

The inventors discovered that augmented reality systems are not capable of locking geospatially located augmented reality content in a position within an environment lacking real objects or has limited objects. Imagine that you are flying a plane 10,000 feet above the ground. The pilot's view may be expansive, but it may absent any real objects that are geolocated with any precision. For example, the pilot may see clouds, the sun, other planes temporarily, but the pilot does not see objects that are generally used to anchor content, such as walls, outdoor geolocated buildings, mapped roads, etc.

The inventors further discovered that in such environments, the systems, in embodiments, required precision location of the user, precision identification of where the user is looking and tracking of these attributes in real-time such that the geolocated content can be more precisely fixed in position. Add to this problem, as the inventors discovered, that when presenting augmented reality content to a fast-moving vehicle in such an environment, the issues get even more challenging.

Systems and methods discovered by the inventors may be used in such environments or even in environments where there are real objects that could be used for anchoring of virtual content. Systems and methods in accordance with the principles of the present inventions may relate to a situation referred to as 'within visual range' of a vehicle. Training within visual range is generally training based on up to approximately 10 miles from an aircraft because that is approximately how far a pilot can see on a clear day. The training may involve presenting visual information in the form of augmented reality content to the pilot where the augmented reality content represents a training asset within the pilot's visual range.

Embodiments of the present invention may provide systems and methods for training a pilot in a real aircraft while flying and performing maneuvers. Such a system may include an aircraft sensor system affixed to the aircraft configured to provide a location of the aircraft, including an altitude of the aircraft, speed of the aircraft, and directional attitude of the aircraft, etc.

The system typically includes a display or a display interface. The display type can vary. For example, in one embodiment, the display comprises at least one of a head-mounted display (HMD), eyeglasses, a Head-Up Display (HUD), smart contact lenses, a virtual retinal display, an eye tap, a Primary Flight Display (PFD), or cockpit glass.

In one embodiment, the system comprises an HMD sensor system (e.g. helmet position sensor system) configured to determine a location of HMD within a cockpit of the aircraft and a viewing direction of a pilot wearing the helmet. The HMD may have a see-through computer display through which the pilot sees an environment outside of the aircraft with computer content overlaying the environment to create an augmented reality view of the environment for the pilot. The system may include a computer content presentation system configured to present computer content to the see-through computer display at a virtual marker, generated by the computer content presentation system, representing a geospatial position of a training asset moving within a visual range of the pilot, such that the pilot sees the computer content from a perspective consistent with the aircraft's position, altitude, attitude, and the pilot's helmet position when the pilot's viewing direction is aligned with the virtual marker. The virtual marker may represent one in a series of geospatial locations that define the movement of the training asset and one of the series may be used as an anchor for the presentation of the virtual training asset content in a frame at a time representing a then current time.

In embodiments, the computer content represents a virtual asset in a training exercise for the pilot. The pilot may use the aircraft controls to navigate the aircraft in response to the virtual asset's location or movement. The computer content presentation system may receive information relating to the pilot's navigation of the aircraft and causes the virtual asset to react to the navigation of the aircraft. The reaction may be selected from a set of possible reactions and/or based on artificial intelligence systems. The virtual training asset may be a virtual aircraft, missile, enemy asset, friendly asset, ground asset, etc.

In embodiments, the augmented reality content's virtual marker's geospatial position is not associated with a real object in the environment. The environment may or may not have real objects in it, but the virtual marker may not be associated with the real object. The inventor's discovered that augmented reality content is generally locked into a location by using a physical object in the environment as an anchor for the content. For example, generally the content may be associated or 'connected' with a building, wall, street, sign, or other object that is either mapped to a location or not. A system or method according to the principles of the present invention may lock the content to a virtual marker in the air such that it can represent a virtual object can be presented as being in the air without being associated with an object in the environment. The apparent stability of such content, as viewed from an operator of a vehicle, may depend on maintaining an accurate geometric understanding of the relative position of the operator's HMD and the content virtual marker's geospatial location. A main cause of error in maintaining the geometric understanding may be maintaining an accurate understanding of the vehicle's position, attitude, speed, vibrations, etc. The geometric understanding between the vehicle and the geospatially located virtual marker may be accurate if the vehicle's location and condition is well understood. In embodiments, the geometric understanding changes quickly because both the vehicle and the virtual marker may be moving through the environment. For example, the vehicle may be a jet fighter aircraft moving at 800 miles per hour and the augmented reality content may represent an antiaircraft missile moving at 1500 miles an hour towards the aircraft. In such a training simulation both the real aircraft and virtual content are moving very fast and the relative geometry between them is changing even faster. A system and method according to the principles of the present invention update the relative geometric understanding describing the relationship between the vehicle and the virtual marker. The system may further include in the relative geometric understanding the vehicle operator's head location and viewing position and/or eye position. To maintain an accurate geometric understanding, a system and method may track information from sensors mounted within the vehicle, including a one or more sensors such as GPS, airspeed sensor, vertical airspeed sensor, stall sensor, IMU, G-Force sensor, avionics sensors, compass, altimeter, angle sensor, attitude heading and reference system sensors, angle of attack sensor, roll sensor, pitch sensor, yaw sensor, force sensors, vibration sensors, gyroscopes, engine sensors, tachometer, control surface sensors, etc.

Systems and methods according to the principles of the present inventions may include a helmet position sensor system that includes a plurality of transceivers affixed within the aircraft configured to triangulate the location and viewing direction of the helmet. The plurality of transceivers may operate at an electromagnetic frequency outside the visible range. The helmet may include at least one marker configured to be recognized by the triangulation system for the identification of the helmet location and helmet viewing direction. For example, the helmet may have several markers on it at known positions and three or more electromagnetic transceivers may be mounted at known locations in the cockpit of an aircraft, or operator's environment in a vehicle. The transceivers each measure, through time-of-flight measurements, the distance between each transceiver and the marker(s) on the helmet and then the measurements may be used to triangulate the location and viewing position of the helmet. In embodiments, the helmet may be markerless and the triangulation system may 'image' the helmet to understand it's location and position.

Systems and methods according to the principles of the present inventions may include a helmet position sensor system that triangulates the helmet position by measuring a plurality of distances from the helmet (or other HMD) to known locations within the aircraft. This may generally be referred to as an inside out measurement. The known locations may include a material with a particular reflection characteristic that is matched with the transceiver system in the helmet.

As disclosed herein, the augmented reality content presented to an operator of a vehicle may be presented based on the physical environment that the vehicle is actually in or it may be based on a different environment such as an environment of another aircraft involved in the simulated training but is geographically remote from the operator. In such a situation, the virtual content presented to the operator may be influenced by the other vehicle's environment. For example, a first aircraft may be flying in a cloudy environment and a second aircraft may be flying in a bright sunny sky. The first aircraft may be presented a virtual environment based on the second aircraft's actual environment. While the pilot of the second aircraft may have to deal with the bright sun at times, the pilot of the first may not. The virtual content presentation system may present the same virtual training asset to both the first and second pilots, but the content may be faded to mimic a difficult to see asset due to the sun. The computer content may have a brightness and contrast, and at least one of the brightness and contrast may be determined by the pilot's viewing direction when the content is presented. The brightness or contrast may be reduced when the viewing direction is towards the sun.

A system and method according to the principles of the present inventions may involve presenting augmented reality content in an environment without relying on real objects in the environment or in environments without real objects. This may involve receiving a geospatial location, including altitude, of virtual content within an environment to understand where the virtual content is to be represented. It may also involve creating a content anchor point at the geospatial location. The system and method may further involve receiving sensor information from a real aircraft sensor system affixed to a real aircraft to provide a location of the aircraft including an altitude of the aircraft, speed of the aircraft, and directional attitude of the aircraft and receiving head position information identifying a viewing position of a pilot within the aircraft. With the virtual content location anchor point understood and the location and conditions of the real aircraft understood, augmented reality content may be presented in a see-through computer display worn by the pilot when the aircraft sensor data, helmet position data and content anchor point align indicating the pilot sees the anchor point.

A system and method according to the principles of the present inventions may involve two or more real airplanes operating in a common virtual environment where the pilots of the respective airplanes are presented common augmented reality content from each's respective perspectives. In embodiments, a computer product, operating on one or more processors, configured to present augmented reality content to a plurality of aircraft within a common virtual environment may include a data transmission system configured to receive geospatial location data from the plurality of aircraft, wherein each of the plurality of aircraft is within visual proximity of one another. It may further involve a training simulation system configured to generate a content anchor at a geospatial location within visual proximity of the plurality of aircraft in an environment. A content presentation system may be configured to present computer-generated content representing a training asset moving within the visual proximity of the plurality of aircraft to each of the plurality of aircraft such that a pilot in each respective aircraft sees the computer-generated content at a perspective determined at least in part on the respective aircraft's location with respect to the anchor location.

A system and method according to the principles of the present inventions may involve two or more real airplanes operating in a common virtual environment where the pilots of the respective airplanes are presented common augmented reality content from each's respective perspectives. In embodiments, a computer product, operating on one or more processors, configured to present augmented reality content to a plurality of aircraft within a common virtual environment may include a data transmission system configured to receive geospatial location data from the plurality of aircraft, wherein each of the plurality of aircraft is geographically separated such that they cannot see one another. Even though they cannot see one another, the training exercise and virtual environment may be configured such that they are virtually in close proximity. Each pilot may be able to 'see' the other plane by seeing an augmented reality representation of the other plane. It may further involve a training simulation system configured to generate a content anchor at a geospatial location within visual proximity of the plurality of aircraft in an environment. A content presentation system may be configured to present computer-generated content representing a training asset moving within the visual proximity of the plurality of aircraft to each of the plurality of aircraft such that a pilot in each respective aircraft sees the computer-generated content at a perspective determined at least in part on the respective aircraft's location with respect to the anchor location.

A system and method according to the principles of the present inventions may involve a simulated training environment with a moving anchor point for virtual content representing a moving augmented reality training asset. In embodiments, a computer product, operating on one or more processors, may be configured to present augmented reality content to a pilot of an aircraft. A data transmission system may be configured to receive geospatial location data from the aircraft as it moves through an environment. A training simulation system may be configured to generate a series of content anchors at geospatial locations within visual proximity of the aircraft, each of the series of content anchors representing a geospatial position of a virtual training asset moving through the environment. A content presentation system may be configured to present the virtual training asset to the aircraft such that a pilot in the aircraft sees the virtual training asset when it is indicated that the pilot viewing angle is aligned with a content anchor from the series of content anchors that represents a then current location of the virtual training asset. The virtual training asset is shaped in a perspective view consistent with the pilot's viewing angle and the then current location of the virtual training asset. For example, a series of progressively changing geospatial locations may represent the movement of a virtual training asset through a virtual environment over a period of time. The movement may be prescribed or pre-programmed and it may represent a sub-second period of time, second(s) period of time, minute(s) period of time, etc. The time period may represent a future period of time to describe how the virtual training asset is going to move in the future. When it becomes time to present the content to the augmented reality system in the aircraft the content may be located at one of the series of locations that represents the then current time to properly align the content. In embodiments, the selected location from the series of locations may be a time slightly in the future of the then current time to make an accommodation for latency in presenting the content.

A system and method according to the principles of the present inventions may involve a simulated training system where a virtual asset has a geospatial location that is independent of a real aircraft's location that is involved in the training. A system and method of presenting the simulated training exercise to a pilot in a real aircraft may involve generating a virtual environment that includes an indication of where the real aircraft is located and what its positional attitude is within the aircraft's real environment. It may further involve generating, within the virtual environment, a virtual asset that is within a visual range of the real aircraft's location and presenting the virtual asset to the pilot as augmented reality content that overlays the pilot's real view of the environment outside of the real aircraft, wherein the virtual asset is presented at a geospatial position that is independent of the real aircraft's location. In embodiments, the virtual asset may move in relation to the aircraft's location and maintain the virtual asset's autonomous movement and location with respect to the aircraft's location. While the virtual asset may react to the real aircraft's movements, the virtual asset may maintain its autonomous control.

The inventors discovered that predicting the future location(s) of a real vehicle that is moving through a real environment can improve the accuracy of the positioning of virtual content in an augmented reality system. This may be especially important when the real vehicle is moving quickly. A system and method in accordance with the principles of the present inventions may involve receiving a series of progressively changing content geospatial locations representing future movement of a virtual asset within a virtual environment, which may be predetermined and preprogrammed. It may also involve receiving a series of progressively changing real vehicle geospatial locations, each associated with a then current acquisition time, representing movement of a real vehicle in a real environment, wherein the virtual environment geospatially represents the real environment. The system and method may predict, based on the series of vehicle locations and related acquisition times, a future geospatial location, and series of future locations, of the vehicle. Then the augmented reality content may be presented to an operator of the vehicle at a position within a field-of-view of a see-through computer display based on the future geospatial location of the vehicle, or a location from the series of locations. It may further be based on the geospatial location of the virtual content, from the series of progressively changing content geospatial locations, representative of a time substantially the same as a time represented by the future geospatial location.

In embodiments, the prediction of the future geospatial location of the vehicle may be based at least in part on past geospatial vehicle locations identified by a sensor system affixed to the vehicle that periodically communicates a then current geospatial location; wherein the past geospatial vehicle locations are interpolated to form a past vehicle location trend. The prediction of the future geospatial location of the vehicle may then be further based on an extrapolation based at least in part on the past vehicle trend. The vehicle may be further represented by an attitude within the real environment and the virtual asset is represented by an attitude within the virtual environment and the presentation of the augmented reality content is further based on the attitude of the vehicle and the attitude of the virtual asset.

A system according to the principles of the present disclosure tracks an airplane's geospatial location (e.g. through GPS) as it moves through the air. It also tracks inertial movements of the plane as well as the avionics in the plane; such as pilot controls for thrust, rudder, alerions, elevator, thrust direction, compass, airspeed indicator, external temperature, g-force meter, etc. With this data, a processor, either onboard or off-plane, can determine an accurate understanding of the plane's current condition, location, attitude, speed, etc. Such processed data can be tracked over time such that a trend analysis can be performed on the data in real time. This real-time trend analysis can further be used to predict where the plane is going to be at a future point in time. For example, the plane's data may be collected every 4 ms and a saved data set may include thousands of points representing the immediate past. The data set can then be used to accurately predict where the plane is going to be in the relative near future (e.g. in the next milliseconds, seconds, minutes). The extrapolated future location prediction based on the past data gets less precise the further into the future the prediction is making. However, the augmented reality content is being presented to a see-through optic at a fast refresh rate such that the position of the content in the optic can be based on the millisecond or second level predictions. As a further example, the refresh rate from a software product that is generating and producing the virtual content rendering (e.g. a gaming engine) may be on the order of 4 ms to 12 ms. This means that the position of the content can be shifted to accommodate a predicted location and pilot visions direction every 4 ms to 12 ms. Knowing the plane's weight and performance characteristics may also be used in the calculations. For example, the processor may factor in that an F-22 fighter jet weighs just over 40,000 pounds and can make a 5G turn at 1,000 miles per hour and understand what the flight path of such a maneuver may look like. Such flight path characteristics would be quite different in an F-16, Harrier, F-35, Cargo plane, etc.

In embodiments, a system may be equipped with a computer processor to read sensor data from the vehicle (e.g. airplane, ground vehicle, space vehicle, etc.) to locate the vehicle and understand its current conditions (e.g. forces, avionics, environment, attitude, etc.). The processor may store the sensor data and evaluate the sensor data. The type of vehicle and/or its powered movement characteristics may be stored and used in conjunction with the sensor data to further understand the present condition of the vehicle. The current and past sensor data and movement characteristics may be fused and analyzed to understand the past performance of the vehicle and this trend analysis may be further used to predict a future position of the vehicle. With the very near future position of the vehicle predicted with precision, virtual content can be presented to the see-through optical system used by a user such that it aligns with a geospatial location of geospatially located content. For example, when the system predicts the location of an airplane one second from now it will be a very accurate prediction. With the accurate prediction of the future location and knowing the future geospatial positioning of the content (e.g. longitude, latitude, and altitude) the virtual content can be positioned relative to the position of the airplane at the future time. The relative, or near absolute, positioning of the content can be refreshed at a very fast rate (e.g. 4 ms). This is fast enough to accommodate the fast repositioning of the fast reposition of the virtual content (e.g. another plane approaching from the opposite direction).

The inventors further discovered that the head and/or eye position of the operator or passenger of the vehicle needs to be well understood as it relates to the position of the vehicle. For example, with an airplane moving at 1,000 miles an hour and its location and condition well understood (as described herein) it is not enough to determine the relative position of the geospatial content. The content needs to be presented in the see-through optic at a correct position such that the user perceives it as being in the proper geospatial position. In a system where the see-through optic is attached to the vehicle surrounding the user's view of the exterior environment, the relative positioning of the content may require an understanding of the user's eye height since the optic is not moving relative to the vehicle. In a system where the see-through optic is attached to the user (e.g. head mounted display ("HMD"), in a helmet, etc.) the position of the user's head will be considered. For example, if the virtual content is on the right side of the vehicle and the user is looking out the left side of the vehicle, the content should not be presented to the see-through optic because the user cannot see the geospatial location anchoring the content. As the user turns her head to view the anchor point the content will be presented at a location within the optic that correlates with a virtual line connecting her position within the vehicle and the anchor position.

In embodiments, the user's head position may be derived using an inside-out (e.g. where an HMD emits electromagnetic energy to measure distances to objects within a user environment and then determining position through triangulation), outside-in (e.g. where there are electromagnetic energy emitters set at known locations within the user's environment and use distance measurements from the emitters to the HMD to triangulate), mechanical system, electrical system, wireless system, wired system, etc. For example, an outside-in system in a cockpit of a jet fighter may use electromagnetics to triangulate the head position using emitters located at known positions within the cockpit. The helmet or other HMD may have markers or be markerless. Marks on the helmet may be used to identify the user's direction of vision. A markerless HMD may be programmed to understand the electromagnetic signature of the HMD such that its viewing position can be derived.

A system may also include an eye tracking system to identify the direction of the user's eyes. This can be used in conjunction with the head position data to determine the general direction the user is looking (e.g. through head position tracking) and specific direction (e.g. through eye position). This may be useful in conjunction with a foveated display where the resolution of the virtual content is increased in the specific direction and decreased otherwise. The acuity of the human eye is very high within a very narrow angle (e.g. 1 or 2 degrees) and it quickly falls off outside of the narrow angle. This can mean that content outside of the high acuity region can be decreased in resolution or sharpness because it is going to be perceived as 'peripheral vision' and it can save processing power and decrease latency because potentially less data is used to render and present content.

In embodiments, an augmented reality system used by an operator of a vehicle may make a precision prediction of the vehicle's future geospatial location, orientation, angular position, attitude, direction, speed (this collection of attributes or sub set of attributes or other attributes describing the vehicle within an environment is generally referred to as the vehicle's condition herein), and acceleration based on the vehicle's past performance of the same factors, or subset or other set of factors, leading up to the vehicle's current state. Including an understanding of the vehicle's capabilities and abilities throughout a range of motions, speeds, accelerations, etc. can assist in the future prediction. Such an augmented reality system may employ artificial intelligence, machine language and the like to make the prediction based on such data collected over time. Such a system may further include an error prediction and include limits on how much error is tolerable given the current situation. For example, the augmented reality system may be able to predict the future position and geometry with great accuracy for three seconds in the future. At a frame rate of 10 ms that means three hundred frames of virtual content can be 'locked in' as to its location and geometry. If the prediction after three seconds and less than five second, for example, is reasonably predictable, the frames to be generated in that period may be rendered from one perspective (e.g. the geometry may be fixed) but not 'locked in' from another (e.g. the location may be approximate to be updated when it gets to the three second prediction point in the data stream. This means you could have three hundred frames locked in and completely available for presentation along with another two hundred frames that are partially rendered in some way. Optional rendering could also be produced if the future prediction system developed more than one alternative path for the vehicle. A method allowing the future rendering of content within a gaming engine could reduce the latency of presenting the content to the see-through optic.

The future location/geometric position/condition prediction systems described herein are very useful when used in fast moving vehicles. A jet aircraft may travel at speeds of 1,300 miles per hour. That is equivalent to 1.9 feet per millisecond. If the content rendering system has a content data output rate of 10 ms, that means there could be 19 feet travelled between frames. That could lead to significant misplacement or poor rendering of the geometry, orientation, etc. of the virtual content if a future prediction of the vehicle's location, geometric position, and condition is not used to impact the generation of the content. Even at much slower speeds the error produced without a future prediction may be significant. Cutting the speed down from 1300 miles per hour to 130 miles per hour could still lead to a near two-foot error between frames in content rendering and placement. Even at highway speed of 65 miles per hour, a one-foot error could be produced.

The future prediction of the vehicle's location and condition may be made to provide processing time before presenting the virtual content. It may further be made such that when the content is ready for presentation the content can be positioned properly within the see-through optic.

An augmented reality system and method in accordance with the principles of the present disclosure may include a geospatial location system configured to identify a current location of a vehicle (e.g. GPS), a plurality of sensors configured to identify the vehicle's positional geometry within an environment (e.g. inertial measurement unit (IMU), G-Force sensor, compass) at the current location, a plurality of sensors configured to identify vectors of force being applied to the vehicle (e.g. IMU, G-Force sensor); a data association and storage module (e.g. a computer processor with memory) configured to associate and store the geospatial location data, positional geometry data, and force vector data with a time of acquisition of each type of data, a computer processor configured to analyze the stored data and generate a trend of the vehicle's positions and conditions over a period of time and extrapolate the trend into a future period of time to produce a future predicted performance, wherein the processor is further adapted (e.g. programmed to execute) to present geospatially located augmented reality content to an operator of the vehicle based on the future predicted performance. The presentation of content based on the future predicted performance is estimated to be presented at a time corresponding with the then current time and location. In other words, the future prediction is used to determine the location and condition of the vehicle in the future, and presentation of the content is done using the prediction of location and condition that is timestamped with the then current time or nearest then current time.

The system and method may further include a head position tracking system configured to identify a viewing direction of a user of an augmented reality see-through computer display, wherein the presentation of the geospatially located content is further based on the viewing direction of the user. The presentation of the geospatially located content may also involve positioning the content within a field-of-view of the see-through computer display based on the viewing direction of the user. The system and method may further comprise an eye direction detection system (e.g. a camera system or other sensor system for imaging and tracking the position and movement of the user's eyes, wherein the presentation of the geospatially located content within the field-of-view is further based on a measured eye position, direction, or motion of the user.

Now referring to the figures, FIG. 1 is an illustration of an online platform 100 consistent with various embodiments of the present disclosure. By way of non-limiting example, the online platform 100 to facilitate provisioning of a virtual experience may be hosted on a centralized server 102, such as, for example, a cloud computing service. The centralized server 102 may communicate with other network entities, such as, for example, an augmented and virtual reality display device 106, a sensor system 110 of an aircraft, database 114 (such as 3D model database) over a communication network 104, such as, but not limited to, the Internet. Further, users of the online platform 100 may include relevant parties such as, but not limited to, trainees, trainers, pilots, administrators, and so on.

A user 112, such as the one or more relevant parties, may access online platform 100 through a web-based software application or browser. The web-based software application may be embodied as, for example, but not be limited to, a website, a web application, a desktop application, and a mobile application compatible with a computing device 1000.

Figure 2:
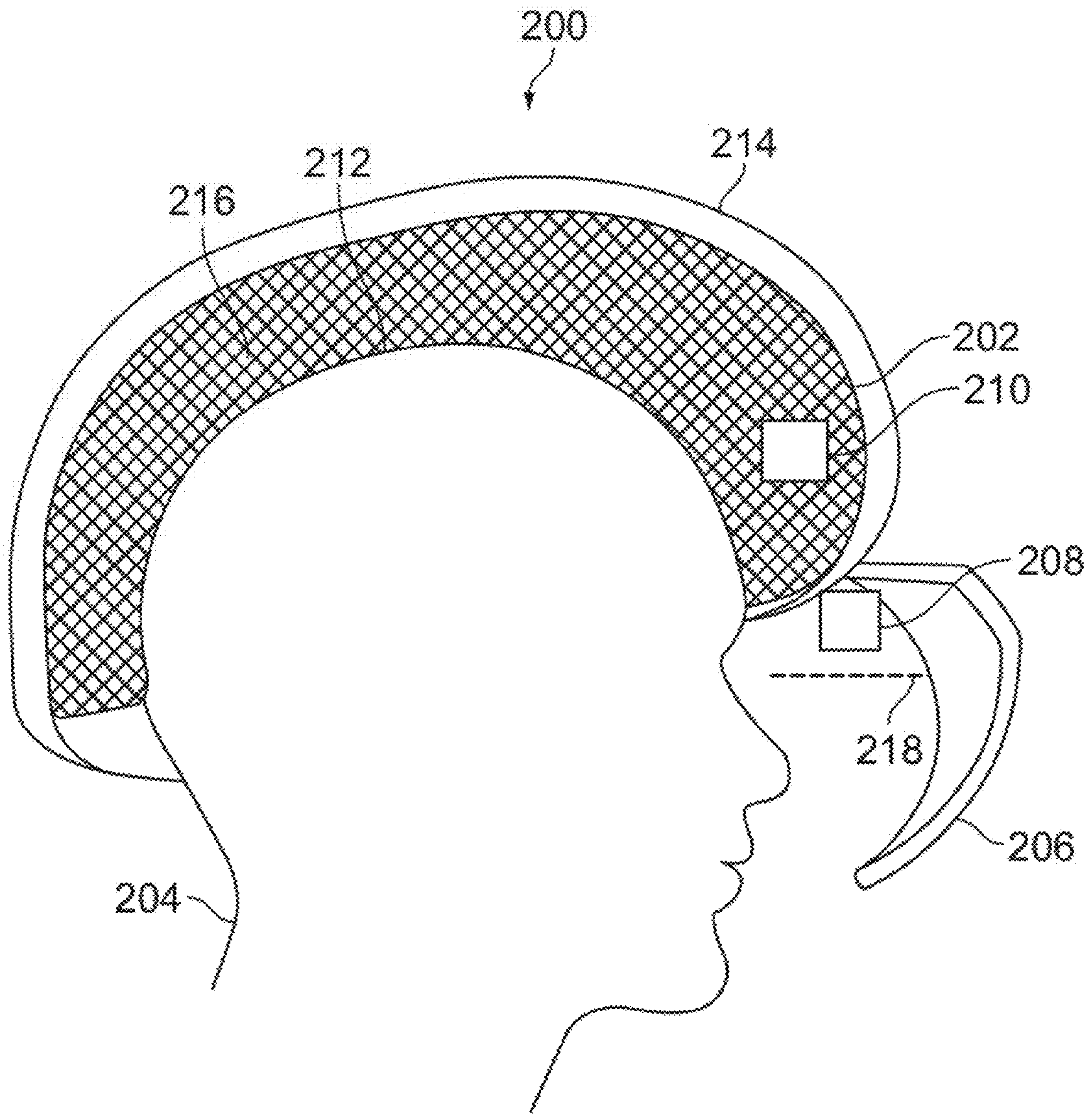
FIG. 2 shows a wearable display device for facilitating provisioning of a virtual experience, in accordance with some embodiments.

FIG. 2 shows a wearable display device 200 for facilitating provisioning of a virtual experience. In some embodiments, the wearable display device 200 may be utilized in conjunction with and/or to effectuate and/or facilitate operation of any element described elsewhere herein or illustrated in any figure herein. Further, the wearable display device 200 may include a support member 202 configured to be mounted on a user 204. Further, the support member 202 may include a structure allowing the support member 202 to be easily mountable on the user 204. For instance, the wearable display device 200 may include a head mounted device (HMD). Further, the wearable display device 200 may include a display device 206 attached to the support member 202. For instance, if the wearable display device 200 is an HMD, the HMD may include a display device in front of one eye of the user 204, (a monocular HMD), in front of both eyes of the user 204, (a binocular HMD), an optical display device (which may reflect projected images), and so on. Further, the display device 206 may be configured for displaying at least one display data. Further, the display data may include virtual reality data related to a simulation, such as a training simulation. For instance, the training simulation may correspond to vehicular racing, such as Formula 1®, and may be used by race car drivers to train for race events. Further, in an instance, the training simulation may correspond to flight training, and may be used by air force pilots for flight training in fighter aircraft. Further, in some embodiments, the display data may include augmented reality data. Accordingly, the display data may include one or more augmented reality components overlaid on top of live image. For instance, the augmented reality data may be related to flight training including a first aircraft training simultaneously with a plurality of aircraft in different locations. Accordingly, the augmented reality data may include augmented reality components displaying the plurality of aircraft in different locations to a display device associated with a pilot of the first aircraft. Further, the wearable display device 200 may include at least one disturbance sensor 208 configured for sensing a disturbance in a spatial relationship between the display device 206 and the user 204. Further, the spatial relationship between the display device 206 and the user 204 may include at least one of distance or orientation. For instance, the spatial relationship may include an exact distance, and an orientation, such as a precise angle between the display device 206 and the eyes of the user 204.

Further, the disturbance in the spatial relationship may include a change in at least one of distance or orientation between the display device 206 and the user 204. Further, the disturbance in the spatial relationship may lead to an alteration in how the user 204 may view the display data. For instance, if the disturbance in the spatial relationship leads to a reduction in the distance between the display device 206 and the user 204, the user 204 may perceive one or more objects in the display data to be closer. For instance, if the spatial relationship between the display device 206 and the user 204 specifies a distance of "x" centimeters, and the disturbance in the spatial relationship leads to a reduction in the distance between the display device 206 and the user 204 to "y" centimeters, the user 204 may perceive the display data to be closer by "x-y" centimeters.

Further, the wearable display device 200 may include a processing device 210 communicatively coupled with the display device 206. Further, the processing device 210 may be configured for receiving the display data. Further, the processing device 210 may be configured for analyzing the disturbance in the spatial relationship. Further, the processing device 210 may be configured for generating a correction data based on the analyzing. Further, the processing device 210 may be configured for generating a corrected display data based on the display data and the correction data. Further, the correction data may include an instruction to shift a perspective view of the display data to compensate for the disturbance in the spatial relationship between the display device 206 and the user 204. Accordingly, the correction data may be generated contrary to the disturbance in the spatial relationship.

For instance, the disturbance may include an angular disturbance, wherein the display device 206 may undergo an angular displacement as a result of the angular disturbance. Accordingly, the correction data may include an instruction of translation of the display data to compensate for the angular disturbance. Further, the display data may be translated along a horizontal axis of the display data, a vertical axis of the display data, a diagonal axis of the display data, and so on, to negate the angular displacement of the display data.

Further, in an instance, the disturbance may include a longitudinal disturbance, wherein the display device 206 may undergo a longitudinal displacement as a result of the longitudinal displacement. Accordingly, the correction data may include an instruction of translation of the display data to compensate for the longitudinal disturbance. Further, the display data may be projected along a distance perpendicular to a line of sight of the user 204 to negate the angular displacement of the display data. For instance, the display data may be projected along a distance perpendicular to the line of sight of the user 204 opposite to a direction of the longitudinal disturbance to compensate for the longitudinal disturbance.

Further, the support member 202 may include a head gear configured to be mounted on a head of the user 204. Further, the head gear may include a helmet configured to be worn over a crown of the head. Further, the head gear may include a shell configured to accommodate at least a part of a head of the user 204. Further, a shape of the shell may define a concavity to facilitate accommodation of at least the part of the head. Further, the shell may include an interior layer 212, an exterior layer 214 and a deformable layer 216 disposed in between the interior layer 212 and the exterior layer 214. Further, the deformable layer 216 may be configured to provide cushioning. Further, the display device 206 may be attached to at least one of the interior layer 212 and the exterior layer 214.

Further, the disturbance in the spatial relationship may be based on a deformation of the deformable layer 216 due to an acceleration of the head gear. Further, the spatial relationship may include at least one vector representing at least one position of at least one part of the display device 206 in relation to at least one eye of the user 204. Further, a vector of the vector may be characterized by an orientation and a distance. For instance, the spatial relationship between the display device 206 and the user 204 may include at least one of distance or orientation. For instance, the spatial relationship may include an exact distance, and an orientation, such as a precise angle between the display device 206 and the eyes of the user 204. Further, the spatial relationship may describe an optimal arrangement of the display device 206 with respect to the user 204. Further, so that the optimal arrangement of the display device 206 with respect to the user 204 may allow the user to clearly view the display data without perceived distortion.

Further, in some embodiments, the disturbance sensor 208 may include an accelerometer configured for sensing the acceleration. Further, in some embodiments, the disturbance sensor 208 may include at least one proximity sensor configured for sensing at least one proximity between the part of the display device 206 and the user 204. Further, in some embodiments, the disturbance sensor 208 may include a deformation sensor configured for sensing a deformation of the deformable layer 216.

Further, in some embodiments, the display device 206 may include a see-through display device 206 configured to allow the user 204 to view a physical surrounding of the wearable device.

Further, in some embodiments, the display data may include at least one object model associated with at least one object. Further, in some embodiments, the generating of the corrected display data may include applying at least one transformation to the object model based on the correction data.

Further, the applying of the transformation to the object model based on the correction data may include translation of the display data to compensate for the angular disturbance. For instance, the correction data may include one or more instructions to translate the display data along a horizontal axis of the display data, a vertical axis of the display data, a diagonal axis of the display data, and so on, to negate the angular displacement of the display data. Accordingly, applying of the transformation to the object model based on the correction data may include translation of the display data along the horizontal axis, the vertical axis, and the diagonal axis of the display data, to negate the angular displacement of the display data. Further, in an instance, if the correction data includes an instruction of translation of the display data to compensate for the longitudinal disturbance, the applying of the transformation to the object model based on the correction data may include translation may include projection of the display data along a distance perpendicular to a line of sight of the user 204 to negate the angular displacement of the display data. For instance, the applying of the transform may include projection of the display data along a distance perpendicular to the line of sight of the user 204 opposite to a direction of the longitudinal disturbance to compensate for the longitudinal disturbance.

Further, in some embodiments, the disturbance sensor 208 may include a camera configured to capture an image of each of a face of the user 204 and at least a part of the head gear. Further, the spatial relationship may include disposition of at least the part of the head gear in relation to the face of the user 204.

Further, in some embodiments, the disturbance sensor 208 may include a camera disposed on the display device 206. Further, the camera may be configured to capture an image of at least a part of a face of the user 204. Further, the wearable display device 200 may include a calibration input device configured to receive a calibration input. Further, the camera may be configured to capture a reference image of at least the part of the face of the user 204 based on receiving the calibration input. Further, the calibration input may be received in an absence of the disturbance. For instance, the calibration input device may include a button configured to be pushed by the user 204 in absence of the disturbance whereupon the reference image of at least the part of the face of the user 204 may be captured. Further, the analyzing of the disturbance may include comparing the reference image with a current image of at least the part of the face of the user 204. Further, the current image may be captured by the camera in the presence of the disturbance. Further, determining the correction data may include determining at least one spatial parameter change based on the comparing. Further, the spatial parameter change may correspond to at least one of a displacement of at least the part of the face relative to the camera and a rotation about at least one axis of at least the part of the face relative to the camera.

Further, in some embodiments, the generating of the corrected display data may include applying at least one image transform on the display data based on the spatial parameter change.

Further, in some embodiments, the wearable display device 200 may include at least one actuator coupled to the display device 206 and the support member 202. Further, the actuator may be configured for modifying the spatial relationship based on a correction data.

Further, the spatial relationship between the display device 206 and the user 204 may include at least one of a distance 218 and an orientation. Further, the disturbance in the spatial relationship between the display device 206 and the user 204 may include a change in at least one of the distance 218, the angle, the direction, or the orientation. Further, the distance 218 may include a perceived distance between the user 204 and the display data. For instance, the disturbance in the spatial relationship may originate due to a forward acceleration of the user 204 and the wearable display device 200. Accordingly, the deformation of the deformable layer 216 may lead to a disturbance in the spatial relationship leading to a change in the distance 218 to a reduced distance between the display device 206 and the user 204. Accordingly, the correction data may include transforming of the display data through object level processing and restoring the display data to the distance 218 from the user 204. Further, the object level processing may include projecting one or more objects in the display data at the distance 218 instead of the reduced distance to oppose the disturbance in the spatial relationship. Further, the disturbance in the spatial relationship may include a change in the angle between the display device 206 and the user 204. Further, the angle between the display device 206 and the user 204 in the spatial relationship may be related to an original viewing angle related to the display data. Further, the original viewing angle related to the display data may be a viewing angle at which the user 204 may view the display data through the display device 206. Further, the disturbance in the spatial relationship may lead to a change in the original viewing angle related to the display data. Accordingly, the display data may be transformed through pixel level processing to restore the original viewing angle related to the display data. Further, the pixel level processing may include translation of the display data to compensate for the change in the angle in the spatial relationship. Further, the display data may be translated along a horizontal axis of the display data, a vertical axis of the display data, a diagonal axis of the display data, and so on, to negate the angular displacement of the display data to compensate for the change in the angle in the spatial relationship, and to restore the original viewing angle related to the display data.

Figure 3:
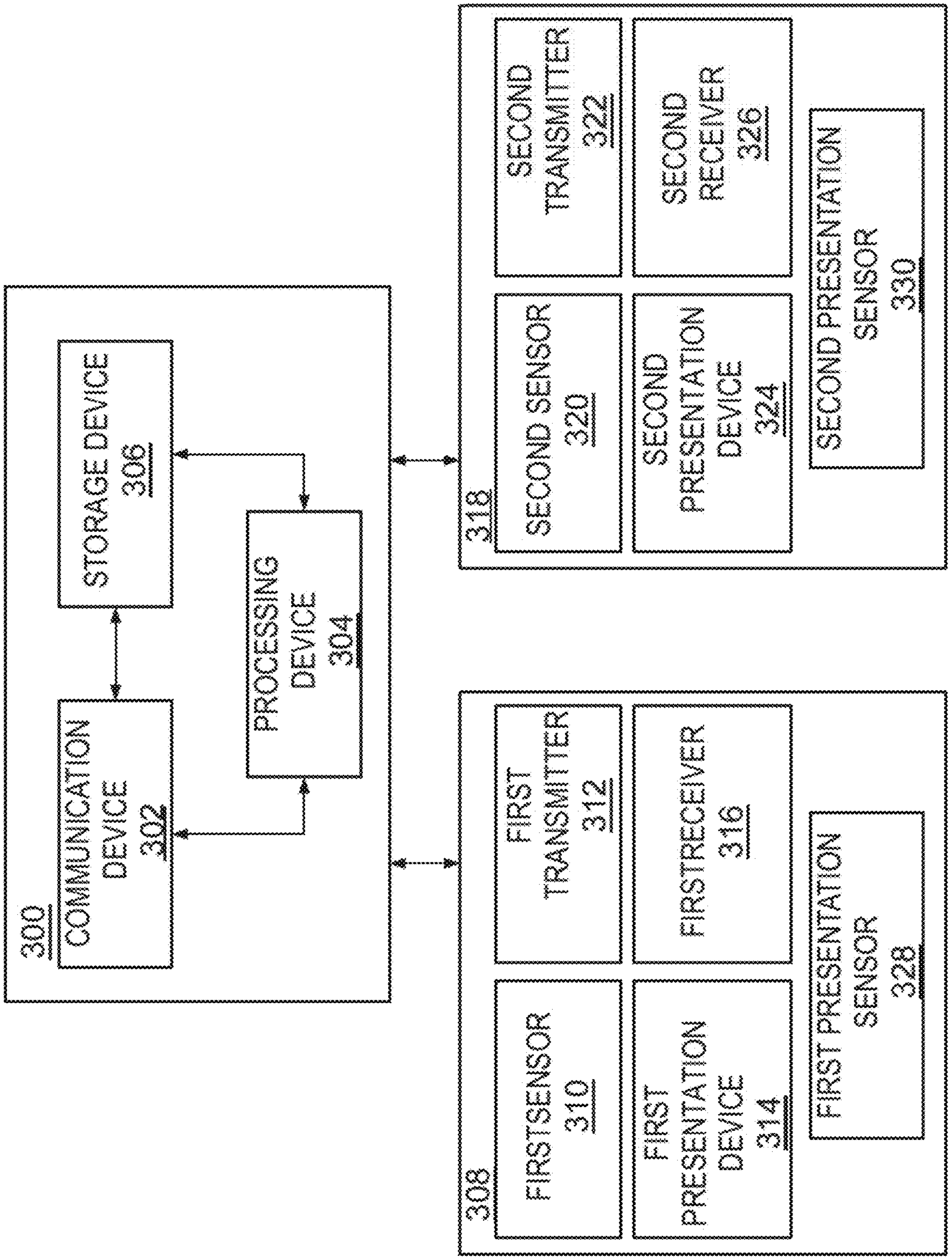
FIG. 3 is a block diagram of a system for facilitating provisioning of a virtual experience in accordance with some embodiments.

FIG. 3 is a block diagram of a system 300 for facilitating provisioning of a virtual experience in accordance with some embodiments. The system 300 may include a communication device 302, a processing device 304 and a storage device 306.

The communication device 302 may be configured for receiving at least one first sensor data corresponding to at least one first sensor 310 associated with a first vehicle 308. Further, the first sensor 310 may be communicatively coupled to a first transmitter 312 configured for transmitting the first sensor data over a first communication channel. In some embodiments, the first vehicle 308 may be a first aircraft. Further, the first user may be a first pilot.

Further, the communication device 302 may be configured for receiving at least one second sensor data corresponding to at least one second sensor 320 associated with a second vehicle 318. Further, the second sensor 320 may be communicatively coupled to a second transmitter 322 configured for transmitting the second sensor data over a second communication channel. In some embodiments, the second vehicle 318 may be a second aircraft. Further, the second user may be a second pilot.

In some embodiments, the first sensor data may be received from a first On-Board-Diagnostics (OBD) system of the first vehicle 308, the second sensor data may be received from a second On-Board-Diagnostics (OBD) system of the second vehicle 318.

Further, the communication device 302 may be configured for receiving at least one first presentation sensor data from at least one first presentation sensor 328 associated with the first vehicle 308. Further, the first presentation sensor 328 may be communicatively coupled to the first transmitter configured for transmitting the first presentation sensor data over the first communication channel. Further, in an embodiment, the first presentation sensor 328 may include a disturbance sensor, such as the disturbance sensor 208 configured for sensing a disturbance in a first spatial relationship between at least one first presentation device 314 associated with the first vehicle 308, and the first user. Further, the spatial relationship between the first presentation device 314 and the first user may include at least one of distance or orientation. For instance, the first spatial relationship may include an exact distance, and an orientation, such as a precise angle between the first presentation device 314 and the eyes of the first user. Further, the disturbance in the first spatial relationship may include a change in the at least of the distance and the orientation between the first presentation device 314 and the first user.

Further, the communication device 302 may be configured for receiving at least one second presentation sensor data from at least one second presentation sensor 330 associated with the second vehicle 318.

Further, in an embodiment, the second presentation sensor 330 may include a disturbance sensor configured for sensing a disturbance in a second spatial relationship between at least one second presentation device 324 associated with the second vehicle 318, and the second user.

Further, the second presentation sensor 330 may be communicatively coupled to the first transmitter configured for transmitting the second presentation sensor data over the second communication channel.

Further, the communication device 302 may be configured for transmitting at least one first optimized presentation data to at least one first presentation device 314 associated with the first vehicle 308. Further, in an embodiment, at least one first presentation device 314 may include a wearable display device facilitating provisioning of a virtual experience, such as the wearable display device 200. Further, in an embodiment, the first optimized presentation data may include a first corrected display data generated based on a first correction data.

Further, the first presentation device 314 may include a first receiver 316 configured for receiving the first optimized presentation data over the first communication channel. Further, the first presentation device 314 may be configured for presenting the first optimized presentation data.

Further, the communication device 302 may be configured for transmitting at least one second optimized presentation data to at least one first presentation device 314 associated with the first vehicle 308. Further, the first receiver 316 may be configured for receiving the second optimized presentation data over the first communication channel. Further, the first presentation device 314 may be configured for presenting the second optimized presentation data.

Further, in an embodiment, the second optimized presentation data may include a second corrected display data generated based on a second correction data.

Further, the communication device 302 may be configured for transmitting at least one second optimized presentation data to at least one second presentation device 324 associated with the second vehicle 318. Further, the second presentation device 324 may include a second receiver 326 configured for receiving the second optimized presentation data over the second communication channel. Further, the second presentation device 324 may be configured for presenting the second optimized presentation data.

Further, the processing device 304 may be configured for analyzing the first presentation sensor data associated with the first vehicle 308.

Further, the processing device 304 may be configured for analyzing the second presentation sensor data associated with the second vehicle 318.

Further, the processing device 304 may be configured for generating the first correction data based on analyzing the first presentation sensor data associated with the first vehicle 308. Further, the first correction data may include an instruction to shift a perspective view of the first optimized presentation data to compensate for the disturbance in the first spatial relationship between the first presentation device 314 and the first user. Accordingly, the first correction data may be generated contrary to the disturbance in the first spatial relationship. For instance, the disturbance may include an angular disturbance, wherein the first presentation device 314 may undergo an angular displacement as a result of the angular disturbance. Accordingly, the first correction data may include an instruction of translation to generate the first corrected display data included in the first optimized presentation data to compensate for the angular disturbance.

Further, the processing device 304 may be configured for generating the second correction data based on the analyzing the second presentation sensor data associated with the second vehicle 318. Further, the second correction data may include an instruction to shift a perspective view of the second optimized presentation data to compensate for the disturbance in the second spatial relationship between the second presentation device 324 and the second user. Accordingly, the second correction data may be generated contrary to the disturbance in the second spatial relationship. For instance, the disturbance may include an angular disturbance, wherein the second presentation device 324 may undergo an angular displacement as a result of the angular disturbance. Accordingly, the second correction data may include an instruction of translation to generate the second corrected display data included in the second optimized presentation data to compensate for the angular disturbance.

Further, the processing device 304 may be configured for generating the first optimized presentation data based on the second sensor data.

Further, the processing device 304 may be configured for generating the first optimized presentation data based on the first presentation sensor data.

Further, the processing device 304 may be configured for generating the second optimized presentation data based on the first sensor data.

Further, the processing device 304 may be configured for generating the second optimized presentation data based on the second presentation sensor data.

Further, the storage device 306 may be configured for storing each of the first optimized presentation data and the second optimized presentation data.

In some embodiments, the first sensor 310 may include one or more of a first orientation sensor, a first motion sensor, a first accelerometer, a first location sensor, a first speed sensor, a first vibration sensor, a first temperature sensor, a first light sensor and a first sound sensor. Further, the second sensor 320 may include one or more of a second orientation sensor, a second motion sensor, a second accelerometer, a second location sensor, a second speed sensor, a second vibration sensor, a second temperature sensor, a second light sensor and a second sound sensor.

In some embodiments, the first sensor 310 may be configured for sensing at least one first physical variable associated with the first vehicle 308. Further, the second sensor 320 may be configured for sensing at least one second physical variable associated with the second vehicle 318. In further embodiments, the first physical variable may include one or more of a first orientation, a first motion, a first acceleration, a first location, a first speed, a first vibration, a first temperature, a first light intensity and a first sound. Further, the second physical variable may include one or more of a second orientation, a second motion, a second acceleration, a second location, a second speed, a second vibration, a second temperature, a second light intensity and a second sound.

In some embodiments, the first sensor 310 may include a first environmental sensor configured for sensing a first environmental variable associated with the first vehicle 308. Further, the second sensor 320 may include a second environmental sensor configured for sensing a second environmental variable associated with the second vehicle 318.

In some embodiments, the first sensor 310 may include a first user sensor configured for sensing a first user variable associated with a first user of the first vehicle 308. Further, the second sensor 320 may include a second user sensor configured for sensing a second user variable associated with a second user of the second vehicle 318.

In further embodiments, the first user variable may include a first user location and a first user orientation. Further, the second user variable may include a second user location and a second user orientation. Further, the first presentation device may include a first head mount display. Further, the second presentation device may include a second head mount display.

In further embodiments, the first head mount display may include a first user location sensor of the first sensor 310 configured for sensing the first user location and a first user orientation sensor of the first sensor 310 configured for sensing the first user orientation. Further, the second head mount display may include a second user location sensor of the second sensor 320 configured for sensing the second user location, a second user orientation sensor of the second sensor 320 configured for sensing the second user orientation.

In further embodiments, the first vehicle 308 may include a first user location sensor of the first sensor 310 configured for sensing the first user location and a first user orientation sensor of the first sensor 310 configured for sensing the first user orientation. Further, the second vehicle 318 may include a second user location sensor of the second sensor 320 configured for sensing the second user location, a second user orientation sensor of the second sensor 320 configured for sensing the second user orientation.

In further embodiments, the first user orientation sensor may include a first gaze sensor configured for sensing a first eye gaze of the first user. Further, the second user orientation sensor may include a second gaze sensor configured for sensing a second eye gaze of the second user.

In further embodiments, the first user location sensor may include a first proximity sensor configured for sensing the first user location in relation to the first presentation device 314. Further, the second user location sensor may include a second proximity sensor configured for sensing the second user location in relation to the second presentation device 324.

Further, in some embodiments, the first presentation sensor 328 may include at least one sensor configured for sensing at least one first physical variable associated with the first presentation device 314 associated with the first vehicle 308, such as due to a G-Force, a frictional force, and an uneven movement of the first vehicle 308. For instance, the first presentation sensor 328 may include at least one camera configured to monitor the movement of the first presentation device 314 associated with the first vehicle 308. Further, the first presentation sensor 328 may include at least one accelerometer sensor configured to monitor an uneven movement of the first presentation device 314 associated with the first vehicle 308, such as due to a G-Force, a frictional force, and an uneven movement of the first vehicle

308. Further, the first presentation sensor 328 may include at least one gyroscope sensor configured to monitor an uneven orientation of the first presentation device 314 associated with the first vehicle 308, such as due to a G-Force, a frictional force, and an uneven movement of the first vehicle 308.

Further, the second presentation sensor 330 may include at least one sensor configured for sensing at least one first physical variable associated with the second presentation device 324 associated with the second vehicle 318, such as due to a G-Force, a frictional force, and an uneven movement of the second vehicle 318. For instance, the second presentation sensor 330 may include at least one camera configured to monitor a movement of the second presentation device 324 associated with the second vehicle 318. Further, the second presentation sensor 330 may include at least one accelerometer sensor configured to monitor an uneven movement of the second presentation device 324 associated with the second vehicle 318, such as due to a G-Force, a frictional force, and an uneven movement of the second vehicle 318. Further, the second presentation sensor 330 may include at least one gyroscope sensor configured to monitor an uneven orientation of the second presentation device 324 associated with the second vehicle 318, such as due to a G-Force, a frictional force, and an uneven movement of the second vehicle 318.

In some embodiments, the first head mount display may include a first see-through display device. Further, the second head mount display may include a second see-through display device.

In some embodiments, the first head mount display may include a first optical marker configured to facilitate determination of one or more of the first user location and the first user orientation. Further, the first sensor 310 may include a first camera configured for capturing a first image of the first optical marker. Further, the first sensor 310 may be communicatively coupled to a first processor associated with the vehicle. Further, the first processor may be configured for determining one or more of the first user location and the first user orientation based on analysis of the first image. Further, the second head mount display may include a second optical marker configured to facilitate determination of one or more of the second user location and the second user orientation. Further, the second sensor 320 may include a second camera configured for capturing a second image of the second optical marker. Further, the second sensor 320 may be communicatively coupled to a second processor associated with the vehicle. Further, the second processor may be configured for determining one or more of the second user location and the second user orientation based on analysis of the second image.

In some embodiments, the first presentation device may include a first see-through display device disposed in a first windshield of the first vehicle 308. Further, the second presentation device may include a second see-through display device disposed in a second windshield of the second vehicle 318.

In some embodiments, the first vehicle 308 may include a first watercraft, a first land vehicle, a first aircraft and a first amphibious vehicle. Further, the second vehicle 318 may include a second watercraft, a second land vehicle, a second aircraft and a second amphibious vehicle.

In some embodiments, the second optimized presentation data may include one or more of a first visual data, a first audio data and a first haptic data. Further, the second optimized presentation data may include one or more of a second visual data, a second audio data and a second haptic data.

In some embodiments, the first presentation device 314 may include at least one environmental variable actuator configured for controlling at least one first environmental variable associated with the first vehicle 308 based on the first optimized presentation data. Further, the second presentation device 324 may include at least one environmental variable actuator configured for controlling at least one second environmental variable associated with the second vehicle 318 based on the second optimized presentation data. In further embodiments, the first environmental variable may include one or more of a first temperature level, a first humidity level, a first pressure level, a first oxygen level, a first ambient light, a first ambient sound, a first vibration level, a first turbulence, a first motion, a first speed, a first orientation and a first acceleration, the second environmental variable may include one or more of a second temperature level, a second humidity level, a second pressure level, a second oxygen level, a second ambient light, a second ambient sound, a second vibration level, a second turbulence, a second motion, a second speed, a second orientation and a second acceleration.

In some embodiments, the first vehicle 308 may include each of the first sensor 310 and the first presentation device 314. Further, the second vehicle 318 may include each of the second sensor 320 and the second presentation device 324.

In some embodiments, the storage device 306 may be further configured for storing a first three-dimensional model corresponding to the first vehicle 308 and a second three-dimensional model corresponding to the second vehicle 318. Further, the generating of the first optimized presentation data may be based further on the second three-dimensional model. Further, the generating of the second optimized presentation data may be based further on the first three-dimensional model.

Further, the generating of the first optimized presentation data may be based on the determining of the unwanted movement of the associated with the first presentation device 314 associated with the first vehicle 308, such as due to a G-Force, a frictional force, and an uneven movement of the first vehicle 308. For instance, the first presentation sensor 328 may include at least one camera configured to monitor the movement of the first presentation device 314 associated with the first vehicle 308. Further, the first presentation sensor 328 may include at least one accelerometer sensor configured to monitor an uneven movement of the first presentation device 314 associated with the first vehicle 308, such as due to a G-Force, a frictional force, and an uneven movement of the first vehicle 308. Further, the first presentation sensor 328 may include at least one gyroscope sensor configured to monitor an uneven orientation of the first presentation device 314 associated with the first vehicle 308, such as due to a G-Force, a frictional force, and an uneven movement of the first vehicle 308.

Further, the generating of the second optimized presentation data may be based on the determining of the unwanted movement of the second presentation device 324 associated with the second vehicle 318, such as due to a G-Force, a frictional force, and an uneven movement of the second vehicle 318. For instance, the second presentation sensor 330 may include at least one camera configured to monitor a movement of the second presentation device 324 associated with the second vehicle 318. Further, the second presentation sensor 330 may include at least one accelerometer sensor configured to monitor an uneven movement of the second presentation device 324 associated with the second vehicle 318, such as due to a G-Force, a frictional force, and an uneven movement of the second vehicle 318. Further, the second presentation sensor 330 may include at least one gyroscope sensor configured to monitor an uneven orientation of the second presentation device 324 associated with the second vehicle 318, such as due to a G-Force, a frictional force, and an uneven movement of the second vehicle 318.

In some embodiments, the communication device 302 may be further configured for receiving an administrator command from an administrator device. Further, the generating of one or more of the first optimized presentation data and the second optimized presentation data may be based further on the administrator command. In further embodiments, the first presentation model may include at least one first virtual object model corresponding to at least one first virtual object. Further, the second presentation model may include at least one second virtual object model corresponding to at least one second virtual object. Further, the generating of the first virtual object model may be independent of the second sensor model. Further, the generating of the second virtual object model may be independent of the first sensor model. Further, the generating of one or more of the first virtual object model and the second virtual object model may be based on the administrator command. Further, the storage device 306 may be configured for storing the first virtual object model and the second virtual object model.

In further embodiments, the administrator command may include a virtual distance parameter. Further, the generating of each of the first optimized presentation data and the second optimized presentation data may be based on the virtual distance parameter.

In further embodiments, the first sensor data may include at least one first proximity data corresponding to at least one first external real object in a vicinity of the first vehicle 308. Further, the second sensor data may include at least one second proximity data corresponding to at least one second external real object in a vicinity of the second vehicle 318. Further, the generating of the first optimized presentation data may be based further on the second proximity data. Further, the generating of the second optimized presentation data may be based further on the first proximity data. In further embodiments, the first external real object may include a first cloud, a first landscape feature, a first man-made structure and a first natural object. Further, the second external real object may include a second cloud, a second landscape feature, a second man-made structure and a second natural object.

In some embodiments, the first sensor data may include at least one first image data corresponding to at least one first external real object in a vicinity of the first vehicle 308. Further, the second sensor data may include at least one second image data corresponding to at least one second external real object in a vicinity of the second vehicle 318. Further, the generating of the first optimized presentation data may be based further on the second image data. Further, the generating of the second optimized presentation data may be based further on the first image data.

In some embodiments, the communication device 302 may be further configured for transmitting server authentication data to the first receiver 316. Further, the first receiver 316 may be communicatively coupled to the first processor associated with the first presentation device. Further, the first processor may be communicatively coupled to a first memory device configured to store first authentication data. Further, the first processor may be configured for performing a first server authentication based on the first authentication data and the server authentication data. Further, the first processor may be configured for controlling presentation of the first optimized presentation data on the first presentation device 314 based on the first server authentication. Further, the communication device 302 may be configured for transmitting server authentication data to the second receiver 326. Further, the second receiver 326 may be communicatively coupled to the second processor associated with the second presentation device. Further, the second processor may be communicatively coupled to a second memory device configured to store a second authentication data. Further, the second processor may be configured for performing a second server authentication based on the second authentication data and the server authentication data. Further, the second processor may be configured for controlling presentation of the second optimized presentation data on the second presentation device 324 based on the second server authentication. Further, the communication device 302 may be configured for receiving a first client authentication data from the first transmitter 312. Further, the storage device 306 may be configured for storing the first authentication data. Further, the communication device 302 may be configured for and receiving a second client authentication data from the second transmitter 322. Further, the storage device 306 may be configured for storing the second authentication data. Further, the processing device 304 may be further configured for performing a first client authentication based on the first client authentication data and the first authentication data. Further, the generating of the second optimized presentation data may be further based on the first client authentication. Further, the processing device 304 may be configured for performing a second client authentication based on the second client authentication data and the second authentication data. Further, the generating of the first optimized presentation data may be further based on the second client authentication.

Figure 4:
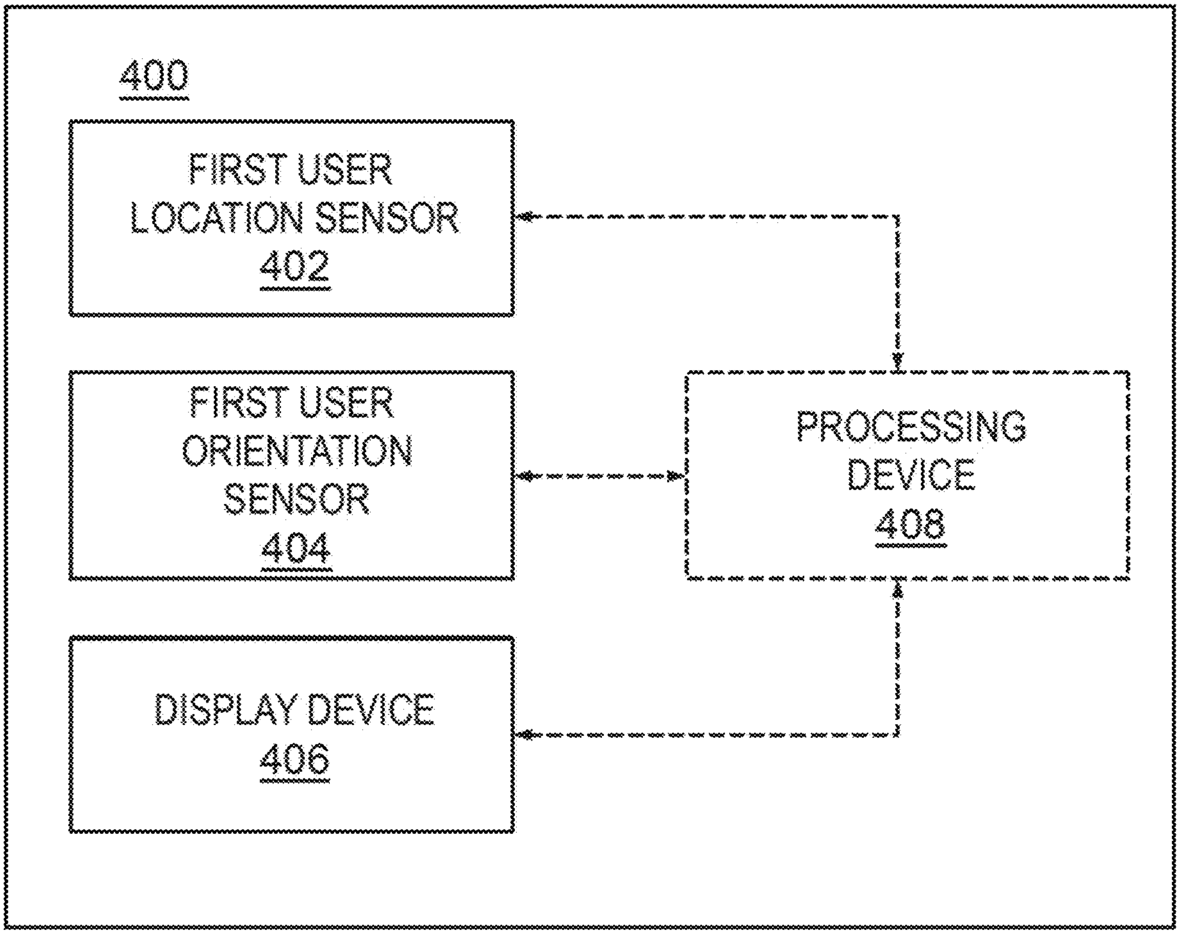
FIG. 4 is a block diagram of a first head mount display for facilitating provisioning of a virtual experience in accordance with some embodiments.

FIG. 4 is a block diagram of a first head mount display 400 for facilitating provisioning of a virtual experience in accordance with some embodiments. The first head mount display 400 may include a first user location sensor 402 of the first sensor configured for sensing the first user location and a first user orientation sensor 404 of the first sensor configured for sensing the first user orientation.

Further, the first head mount display 400 may include a display device 406 to present visuals. Further, in an embodiment, the display device 406 may be configured for displaying the first optimized display data, as generated by the processing device 408.

Further, the first head mount display 400 may include a processing device 408 configured to obtain sensor data from the first user location sensor 402 and the first user orientation sensor 404. Further, the processing device 408 may be configured to send visuals to the display device 406.

Figure 5:
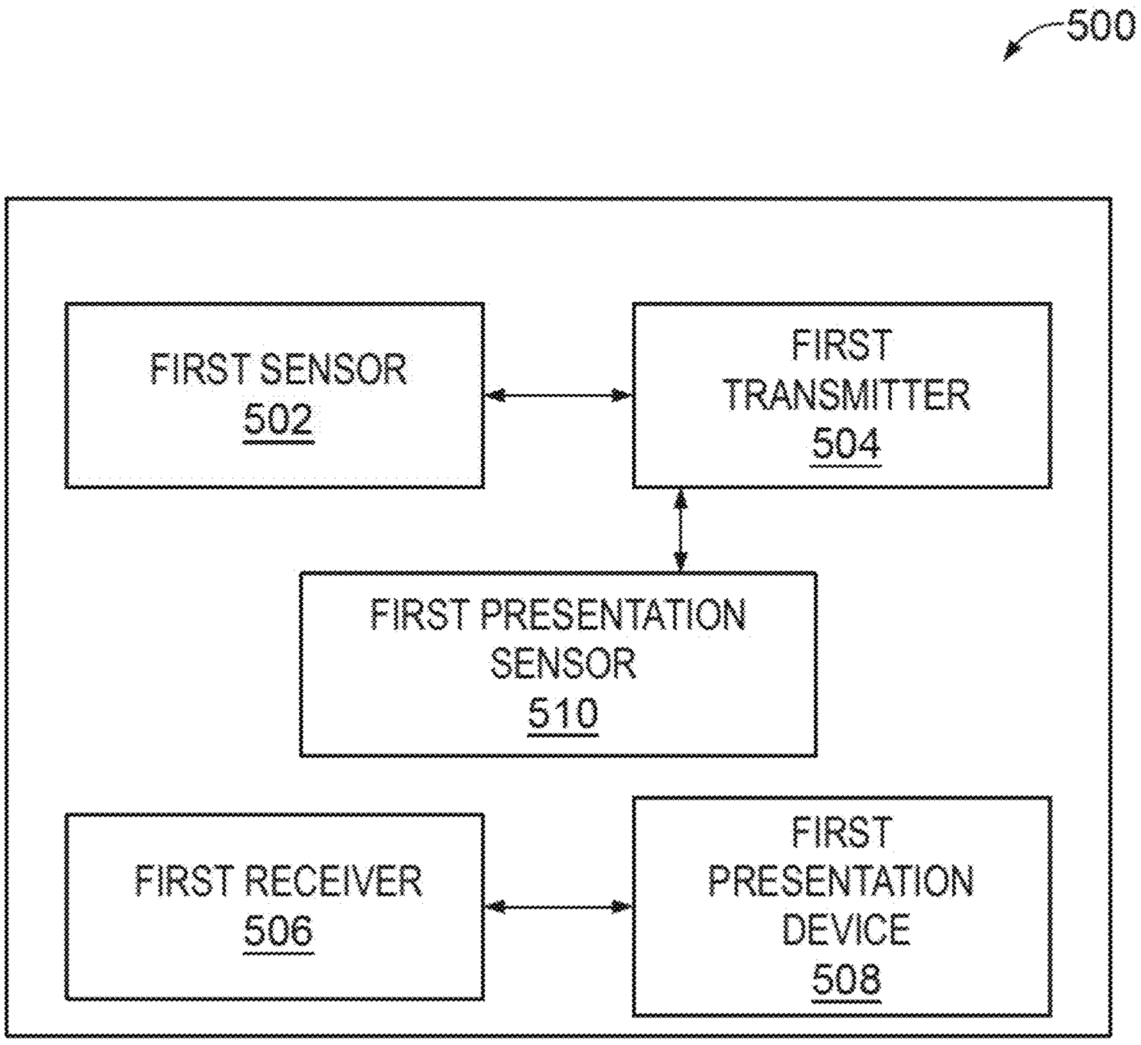
FIG. 5 is a block diagram of an apparatus for facilitating provisioning of a virtual experience in accordance with some embodiments.

FIG. 5 is a block diagram of an apparatus 500 for facilitating provisioning of a virtual experience in accordance with some embodiments. The apparatus 500 may include at least one first sensor 502 (such as the first sensor 310) configured for sensing at least one first sensor data associated with a first vehicle (such as the first vehicle 308).

Further, the apparatus 500 may include at least one first presentation sensor 510 (such as the first presentation sensor 328) configured for sensing at least one first presentation sensor data associated with a first vehicle (such as the first vehicle 308). Further, in an embodiment, the first presentation sensor 510 may include a disturbance sensor, such as the disturbance sensor 208 configured for sensing a disturbance in a first spatial relationship between at least one first presentation device 508 associated with the first vehicle, and a first user. Further, the spatial relationship between the first presentation device 508 and the first user may include at least one of distance or orientation. For instance, the first spatial relationship may include an exact distance, and an orientation, such as a precise angle between the first presentation device 508 and the eyes of the first user. Further, the disturbance in the first spatial relationship may include a change in the at least of the distance and the orientation between the first presentation device 314 and the first user.

Further, the apparatus 500 may include a first transmitter 504 (such as the first transmitter 312) configured to be communicatively coupled to the at least first sensor 502, and the first presentation sensor 510. Further, the first transmitter 504 may be configured for transmitting the first sensor data and the first presentation sensor data to a communication device (such as the communication device 302) of a system over a first communication channel.

Further, the apparatus 500 may include a first receiver 506 (such as the first receiver 316) configured for receiving the first optimized presentation data from the communication device over the first communication channel.

Further, the apparatus 500 may include the first presentation device 508 (such as the first presentation device 314) configured to be communicatively coupled to the first receiver 506. The first presentation device 508 may be configured for presenting the at least one first optimized presentation data.

Further, the communication device may be configured for receiving at least one second sensor data corresponding to at least one second sensor (such as the second sensor 320) associated with a second vehicle (such as the second vehicle 318). Further, the second sensor may be communicatively coupled to a second transmitter (such as the second transmitter 322) configured for transmitting the second sensor data over a second communication channel. Further, the system may include a processing device (such as the processing device 304) communicatively coupled to the communication device. Further, the processing device may be configured for generating the first optimized presentation data based on the second sensor data.

Figure 6:
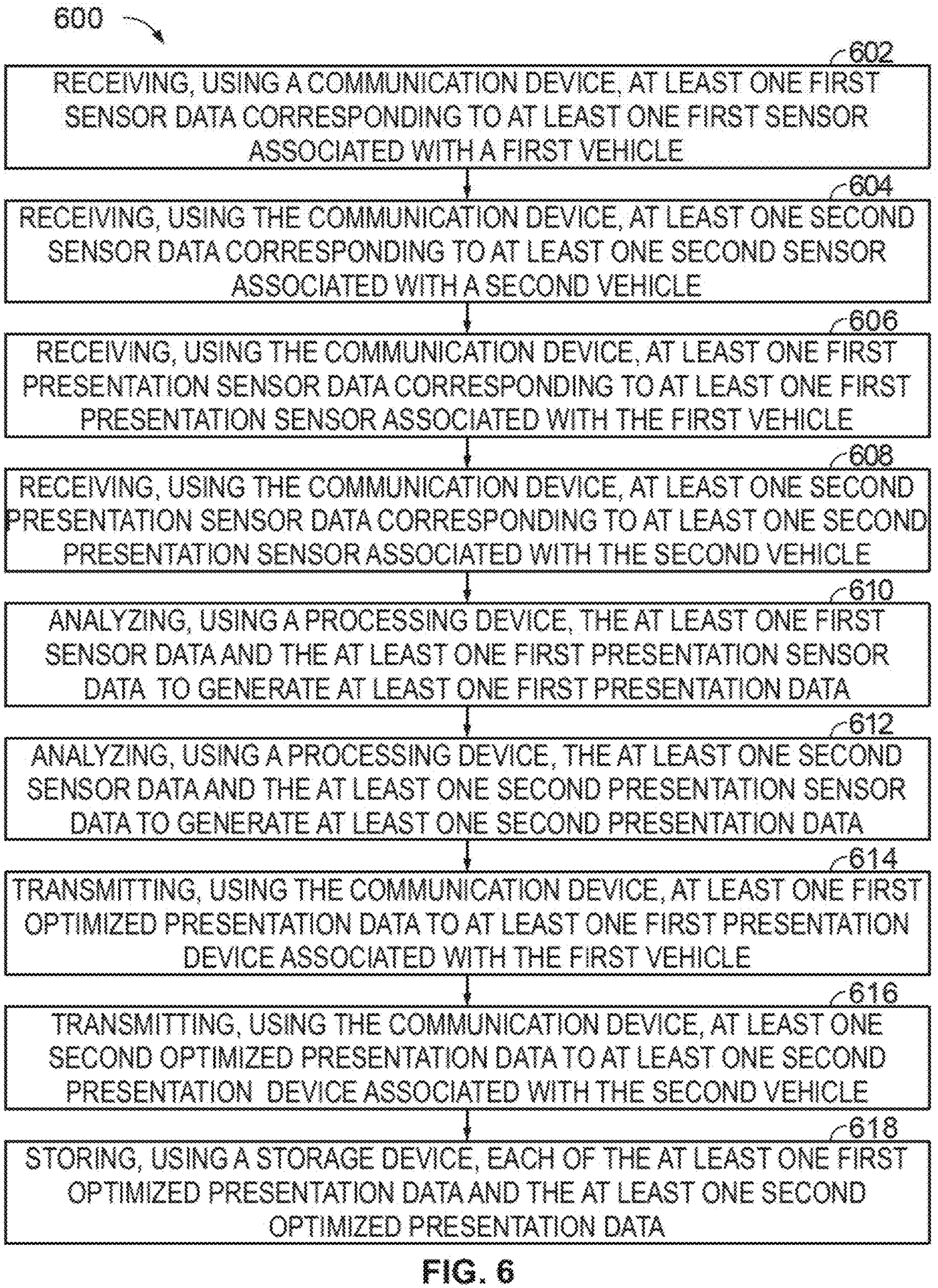
FIG. 6 is a flowchart of a method of facilitating provisioning of a virtual experience in accordance with some embodiments.

FIG. 6 is a flowchart of method 600 of facilitating provisioning of a virtual experience in accordance with some embodiments. At 602, the method 600 may include receiving, using a communication device (such as the communication device 302), at least one first sensor data corresponding to at least one first sensor (such as the first sensor 310) associated with a first vehicle (such as the first vehicle 308). Further, the first sensor may be communicatively coupled to a first transmitter (such as the first transmitter 312) configured for transmitting the first sensor data over a first communication channel.

At 604, the method 600 may include receiving, using the communication device, at least one second sensor data corresponding to at least one second sensor (such as the second sensor 320) associated with a second vehicle (such as the second vehicle 318). Further, the second sensor may be communicatively coupled to a second transmitter (such as the second transmitter 322) configured for transmitting the second sensor data over a second communication channel.

At 606, the method 600 may include receiving, using the communication device, a first presentation sensor data corresponding to at least one first presentation sensor 328 associated with the first vehicle. Further, the first presentation sensor may be communicatively coupled to the first transmitter configured for transmitting the first presentation sensor data over the first communication channel. Further, the first presentation sensor may include at least one sensor configured to monitor a movement of at least one first presentation device associated with the first vehicle, such as due to a G-Force, a frictional force, and an uneven movement of the first vehicle. For instance, the first presentation sensor may include at least one camera configured to monitor the movement of the first presentation device associated with the first vehicle. Further, the first presentation sensor may include at least one accelerometer sensor configured to monitor an uneven movement of the first presentation device associated with the first vehicle, such as due to a G-Force, a frictional force, and an uneven movement of the first vehicle. Further, the first presentation sensor may include at least one gyroscope sensor configured to monitor an uneven orientation of the first presentation device associated with the first vehicle, such as due to a G-Force, a frictional force, and an uneven movement of the first vehicle.

At 608, the method 600 may include receiving, using the communication device, a second presentation sensor data corresponding to at least one second presentation sensor 330 associated with the second vehicle. Further, the second presentation sensor may be communicatively coupled to the second transmitter configured for transmitting the second presentation sensor data over the second communication channel. Further, the second presentation sensor may include at least one sensor configured to monitor a movement of at least one second presentation device associated with the second vehicle, such as due to a G-Force, a frictional force, and an uneven movement of the second vehicle. For instance, the second presentation sensor may include at least one camera configured to monitor the movement of the second presentation device associated with the second vehicle. Further, the second presentation sensor may include at least one accelerometer sensor configured to monitor an uneven movement of the second presentation device associated with the second vehicle, such as due to a G-Force, a frictional force, and an uneven movement of the second vehicle. Further, the second presentation sensor may include at least one gyroscope sensor configured to monitor an uneven orientation of the second presentation device associated with the second vehicle, such as due to a G-Force, a frictional force, and an uneven movement of the second vehicle.

At 610, the method 600 may include analyzing, using a processing device, the first sensor data and the first presentation sensor data to generate at least one first modified presentation data. The analyzing may include determining an unwanted movement of the first presentation device associated with the first vehicle, such as due to a G-Force, a frictional force, and an uneven movement of the first vehicle. Further, the unwanted movement of the first presentation device associated with the first vehicle may include an upward movement, a downward movement, a leftward movement, and a rightward movement. Further, the generating of the first optimized presentation data may be based on the unwanted movement of the first presentation device associated with the first vehicle, such as due to a G-Force, a frictional force, and an uneven movement of the first vehicle. For instance, the generating of the first optimized presentation data may be based on negating an effect of the unwanted movement of the first presentation device associated with the first vehicle. For instance, if the unwanted movement of the first presentation device associated with the first vehicle includes an upward movement, a downward movement, a leftward movement, and a rightward movement, the generating of the first optimized presentation data may include moving one or more components of the first modified presentation data in an oppositely downward direction, an upward direction, a rightward direction, and a leftward direction respectively.

At 612, the method 600 may include analyzing, using a processing device, the second sensor data and the second presentation sensor data to generate at least one second presentation data. The analyzing may include determining an unwanted movement of the second presentation device associated with the second vehicle, such as due to a G-Force, a frictional force, and an uneven movement of the second vehicle. Further, the unwanted movement of the second presentation device associated with the second vehicle may include an upward movement, a downward movement, a leftward movement, and a rightward movement. Further, the generating of the second optimized presentation data may be based on the unwanted movement of the second presentation device associated with the second vehicle, such as due to a G-Force, a frictional force, and an uneven movement of the second vehicle. For instance, the generating of the second optimized presentation data may be based on negating an effect of the unwanted movement of the second presentation device associated with the second vehicle. For instance, if the unwanted movement of the second presentation device associated with the second vehicle includes an upward movement, a downward movement, a leftward movement, and a rightward movement, the generating of the second optimized presentation data may include moving one or more components of the second presentation data in an oppositely downward direction, an upward direction, a rightward direction, and a leftward direction respectively.

At 614, the method 600 may include transmitting, using the communication device, at least one first optimized presentation data to at least one first presentation device associated with the first vehicle. Further, the first presentation device may include a first receiver (such as the first receiver 316) configured for receiving the first modified presentation data over the first communication channel. Further, the presentation device may be configured for presenting the first optimized presentation data.

At 616, the method 600 may include transmitting, using the communication device, at least one second optimized presentation data to at least one second presentation device (such as the second presentation device 324) associated with the second vehicle. Further, the second presentation device may include a second receiver (such as the second receiver 326) configured for receiving the second presentation data over the second communication channel. Further, the presentation device may be configured for presenting the second optimized presentation data.

At 618, the method 600 may include storing, using a storage device (such as the storage device 306), each of the first optimized presentation data and the second optimized presentation data.

Figure 7:
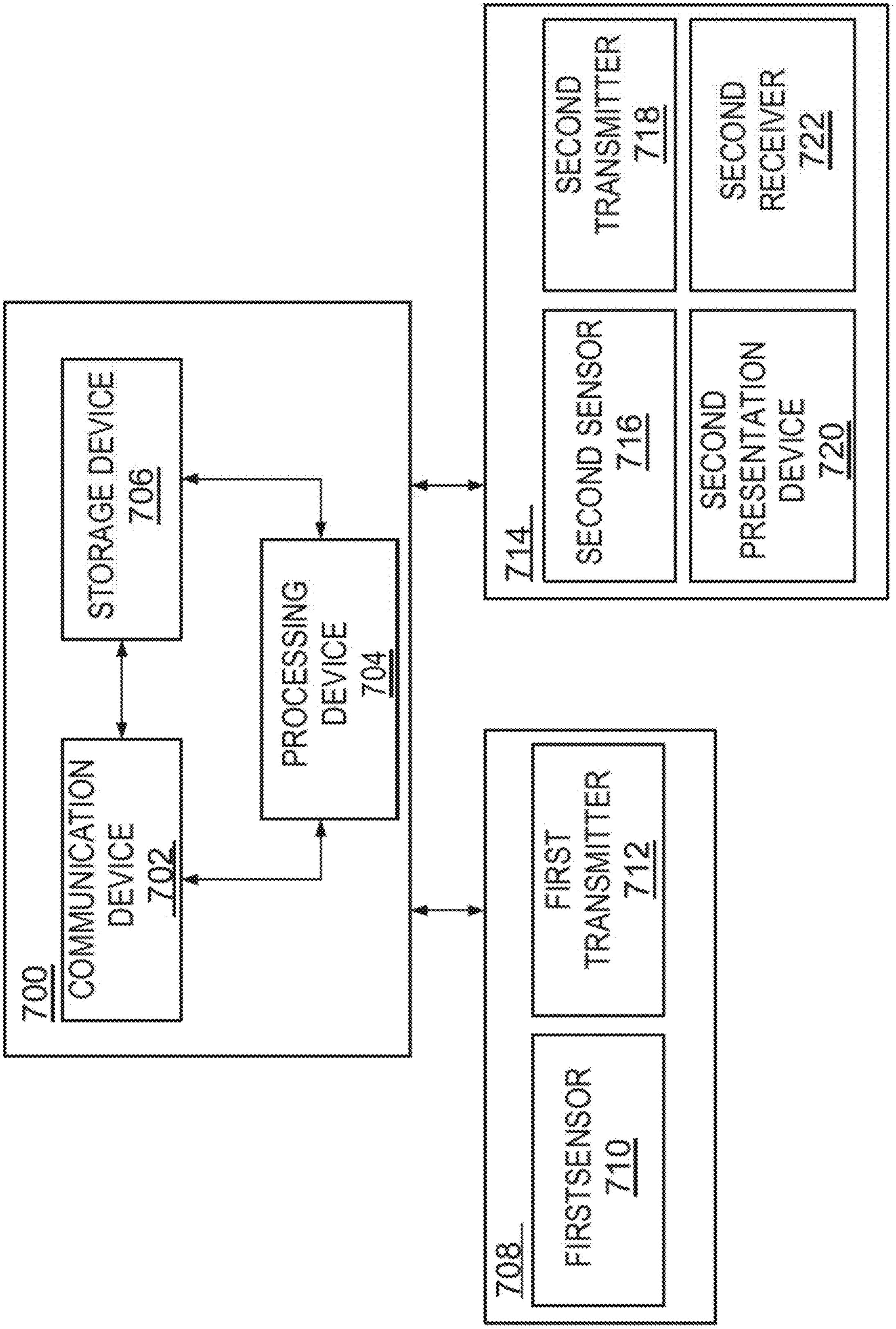
FIG. 7 shows a system for facilitating provisioning of a virtual experience, in accordance with some embodiments.

FIG. 7 shows system 700 for facilitating provisioning of a virtual experience, in accordance with some embodiments. The system 700 may include a communication device 702 configured for receiving at least one first sensor data corresponding to at least one first sensor 710 associated with a first vehicle 708. Further, the first sensor 710 may be communicatively coupled to a first transmitter 712 configured for transmitting the first sensor data over a first communication channel.

Further, the communication device 702 may be configured for receiving at least one second sensor data corresponding to at least one second sensor 716 associated with a second vehicle 714. Further, the second sensor 716 may include a second location sensor configured to detect a second location associated with the second vehicle 714. Further, the second sensor 716 may be communicatively coupled to a second transmitter 718 configured for transmitting the second sensor data over a second communication channel. Further, in some embodiments, the second sensor 716 may include a second user sensor configured for sensing a second user variable associated with a second user of the second vehicle 714. Further, the second user variable may include a second user location and a second user orientation.

Further, in some embodiments, the second sensor 716 may include a disturbance sensor, such as the disturbance sensor 208 configured for sensing a disturbance in a spatial relationship between a second presentation device 720 associated with the second vehicle 714 and the second user of the second vehicle 714. Further, the spatial relationship between the second presentation device 720 and the second user may include at least one of distance or orientation. For instance, the spatial relationship may include an exact distance, and an orientation, such as a precise angle between the second presentation device 720 and the eyes of the second user.

Further, the disturbance in the spatial relationship may include a change in at least of distance or orientation between the second presentation device 720 and the second user. Further, the disturbance in the spatial relationship may lead to an alteration in how the second user may view at least one second presentation data. For instance, if the disturbance in the spatial relationship leads to a reduction in the distance between the second presentation device 720 and the second user, the second user may perceive one or more objects in the second presentation data to be closer. For instance, if the spatial relationship between the second presentation device 720 and the second user specifies a distance of "x" centimeters, and the disturbance in the spatial relationship leads to a reduction in the distance between the second presentation device 720 and the second user to "y" centimeters, the second user may perceive the second presentation data to be closer by "x-y" centimeters.

Further, the communication device 702 may be configured for transmitting the second presentation data to the second presentation device 720 associated with the second vehicle 714. Further, the second presentation data may include at least one second virtual object model corresponding to at least one second virtual object. Further, in some embodiments, the second virtual object may include one or more of a navigational marker and an air-corridor.

Further, in an embodiment, the second presentation data may include a second corrected display data generated based on a second correction data. Further, the second presentation device 720 may include a second receiver 722 configured for receiving the second presentation data over the second communication channel. Further, the second presentation device 720 may be configured for presenting the second presentation data. Further, in some embodiments, the second presentation device 720 may include a second head mount display. Further, the second head mount display may include a second user location sensor of the second sensor 716 configured for sensing the second user location and a second user orientation sensor of the second sensor 716 configured for sensing the second user orientation. Further, the second head mount display may include a second see-through display device.

Figure 8:
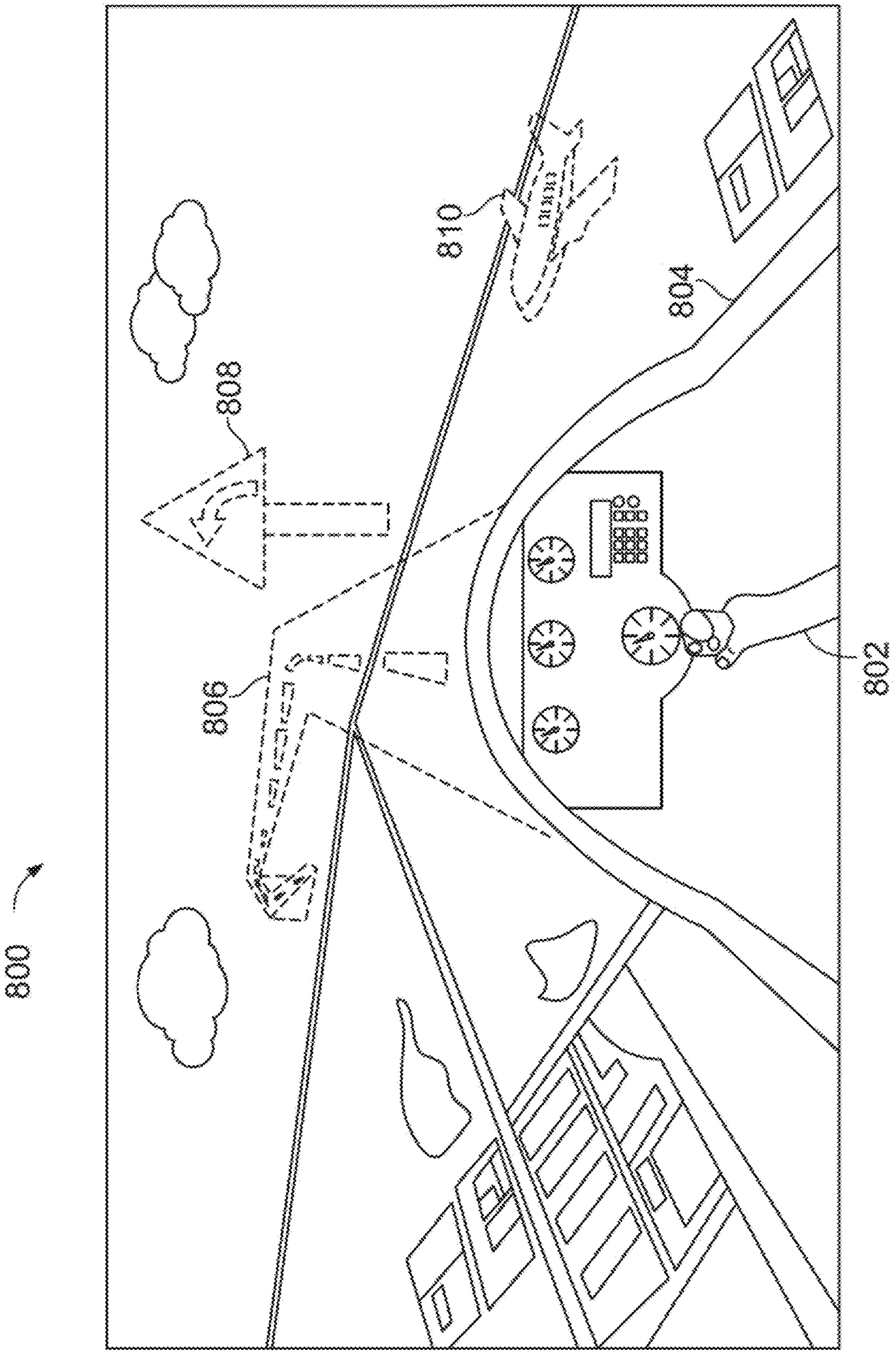
FIG. 8 shows a corrected augmented reality view, in accordance with some embodiments.

Further, in some embodiments, the second virtual object model may include a corrected augmented reality view, such as the corrected augmented reality view 800. Further, the augmented reality view 800 may include one or more second virtual objects such as a navigational marker 808, and a skyway 806 as shown in FIG. 8).

Further, the system 700 may include a processing device 704 configured for generating the second presentation data based on the first sensor data and the second sensor data. Further, the generating of the second virtual object model may be independent of the first sensor data. Further, in some embodiments, the processing device 704 may be configured for determining a second airspace class associated with the second vehicle 714 based on the second location including a second altitude associated with the second vehicle 714. Further, the generating of the second virtual object model may be based on the second airspace class.

Further, the processing device 704 may be configured for generating the second correction data based on the analyzing the second sensor data associated with the second vehicle 714. Further, the second correction data may include an instruction to shift a perspective view of the second presentation data to compensate for the disturbance in the spatial relationship between the second presentation device 720 and the second user. Accordingly, the second correction data may be generated contrary to the disturbance in the spatial relationship. For instance, the disturbance may include an angular disturbance, wherein the second presentation device 720 may undergo an angular displacement as a result of the angular disturbance. Accordingly, the second correction data may include an instruction of translation to generate the second corrected display data included in the second presentation data to compensate for the angular disturbance.

For instance, if the second presentation data includes the second virtual object model may include a corrected augmented reality view, such as the corrected augmented reality view 800, the second correction data may include an instruction to shift a perspective view of the second presentation data to compensate for the disturbance in the spatial relationship between the second presentation device 720 and the second user (such as a pilot 802). For instance, if the disturbance in the spatial relationship includes a reduction in the distance between the second presentation device 720, the second correction data may include an instruction to shift a perspective view of the second presentation data to compensate for the disturbance in the spatial relationship between the second presentation device 720 and the second user, such as by projection of the one or more second virtual objects, such as the navigational marker 808, and the skyway 806 at a distance to compensate the disturbance and to generate the corrected augmented reality view 800.

Further, the system 700 may include a storage device 706 configured for storing the second presentation data. Further, in some embodiments, the storage device 706 may be configured for retrieving the second virtual object model based on the second location associated with the second vehicle 714. Further, in some embodiments, the storage device 706 may be configured for storing a first three-dimensional model corresponding to the first vehicle 708. Further, the generating of the second presentation data may be based on the first three-dimensional model.

Further, in some embodiments, the communication device 702 may be configured for receiving an administrator command from an administrator device. Further, the generating of the second virtual object model may be based on the administrator command.

Further, in some embodiments, the communication device 702 may be configured for transmitting at least one first presentation data to at least one first presentation device (not shown) associated with the first vehicle 708. Further, the first presentation device may include a first receiver configured for receiving the first presentation data over the first communication channel. Further, the first presentation device may be configured for presenting the first presentation data. Further, in some embodiments, the processing device 704 may be configured for generating the first presentation data based on the second sensor data. Further, in some embodiments, the storage device 706 may be configured for storing the first presentation data. Further, in some embodiments, the storage device 706 may be configured for storing a second three-dimensional model corresponding to the second vehicle 714. Further, the generating of the first presentation data may be based on the second three-dimensional model.

Further, in some embodiments, the first presentation data may include at least one first virtual object model corresponding to at least one first virtual object. Further, the generating of the first virtual object model may be independent of the second sensor data. Further, the storage device 706 may be configured for storing the first virtual object model.

Figure 9:
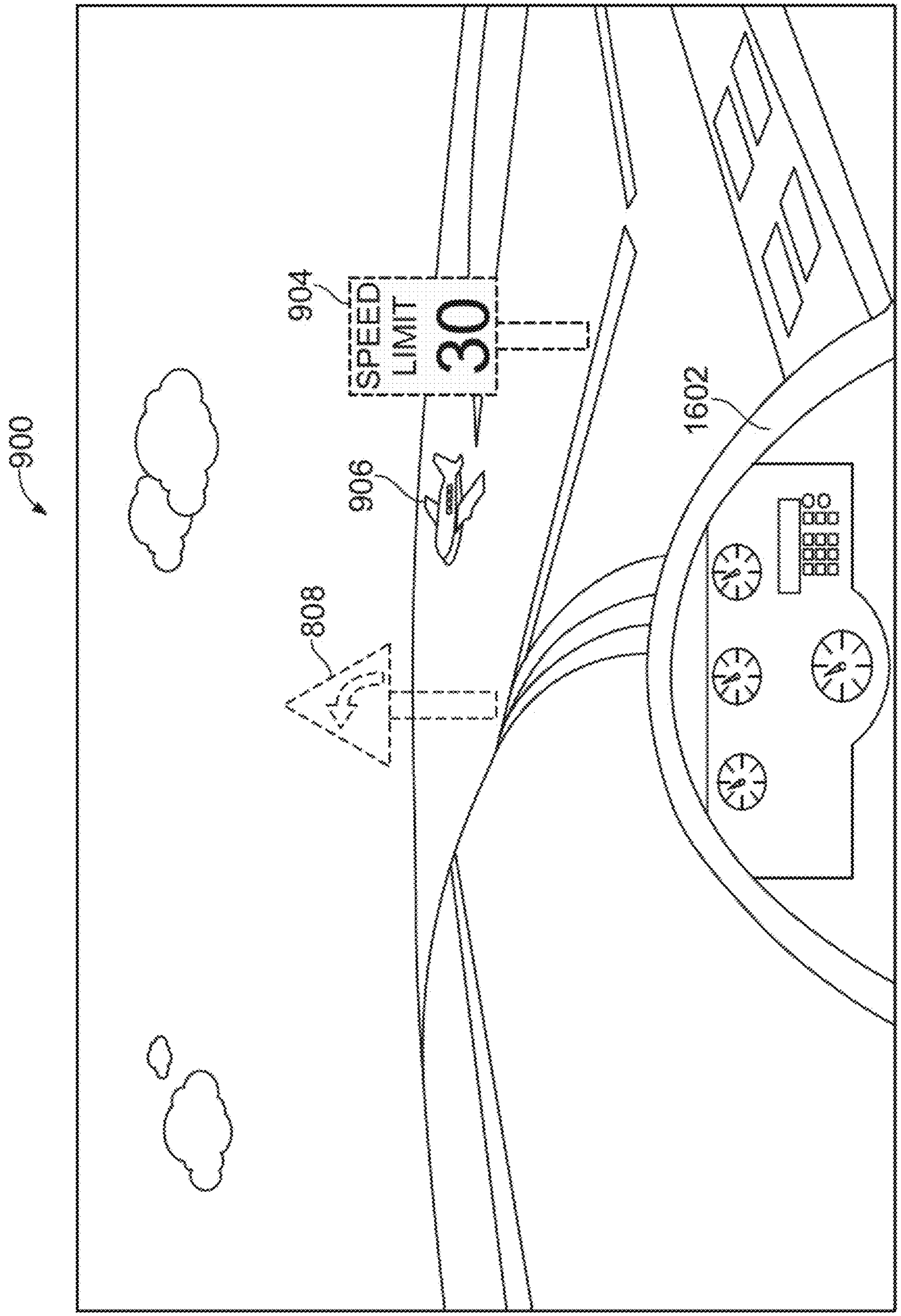
FIG. 9 shows an augmented reality view shown to a real pilot while a civilian aircraft is taxiing at an airport, in accordance with an exemplary embodiment.

Further, in some exemplary embodiment, the communication device 702 may be configured for receiving at least one second sensor data corresponding to at least one second sensor 716 associated with a second vehicle 714. Further, the second sensor 716 may be communicatively coupled to a second transmitter 718 configured for transmitting the second sensor data over a second communication channel. Further, the communication device 702 may be configured for receiving at least one first sensor data corresponding to at least one first sensor 710 associated with a first vehicle 708. Further, the first sensor 710 may include a first location sensor configured to detect a first location associated with the first vehicle 708. Further, the first sensor 710 may be communicatively coupled to a first transmitter 712 configured for transmitting the first sensor data over a first communication channel. Further, in some embodiments, the first sensor 710 may include a first user sensor configured for sensing a first user variable associated with a first user of the first vehicle 708. Further, the first user variable may include a first user location and a first user orientation. Further, the communication device 702 configured for transmitting at least one first presentation data to at least one first presentation device (not shown) associated with the first vehicle 708. Further, the first presentation data may include at least one first virtual object model corresponding to at least one first virtual object. Further, in some embodiments, the first virtual object may include one or more of a navigational marker (such as a navigational marker 808, and/or a signboard 904 as shown in FIG. 9) and an air-corridor (such as a skyway 806 as shown in FIG. 8). Further, the first presentation device may include a first receiver configured for receiving the first presentation data over the first communication channel. Further, the first presentation device may be configured for presenting the first presentation data. Further, in some embodiments, the first presentation device may include a first head mount display. Further, the first head mount display may include a first user location sensor of the first sensor 710 configured for sensing the first user location and a first user orientation sensor of the first sensor 710 configured for sensing the first user orientation. Further, the first head mount display may include a first see-through display device. Further, the processing device 704 may be configured for generating the first presentation data based on the second sensor data and the first sensor data. Further, the generating of the first virtual object model may be independent of the second sensor data. Further, in some embodiments, the processing device 704 may be configured for determining a first airspace class associated with the first vehicle 708 based on the first location including a first altitude associated with the first vehicle 708. Further, the generating of the first virtual object model may be based on the first airspace class. Further, in some embodiments, the storage device 706 may be configured for storing the first presentation data. Further, in some embodiments, the storage device 706 may be configured for retrieving the first virtual object model based on the first location associated with the first vehicle 708. Further, in some embodiments, the storage device 706 may be configured for storing a second three-dimensional model corresponding to the second vehicle 714. Further, the generating of the first presentation data may be based on the second three-dimensional model. Further, in some embodiments, the communication device 702 may be configured for receiving an administrator command from an administrator device. Further, the generating of the first virtual object model may be based on the administrator command. Further, in some embodiments, the communication device 702 may be configured for transmitting at least one second presentation data to at least one second presentation device (such as the second presentation device 720) associated with the second vehicle 714. Further, the second presentation device may include a second receiver (such as the second receiver 722) configured for receiving the second presentation data over the second communication channel. Further, the second presentation device may be configured for presenting the second presentation data. Further, in some embodiments, the processing device 704 may be configured for generating the second presentation data based on the first sensor data. Further, in some embodiments, the storage device 706 may be configured for storing the second presentation data. Further, in some embodiments, the storage device 706 may be configured for storing a first three-dimensional model corresponding to the first vehicle 708. Further, the generating of the second presentation data may be based on the first three-dimensional model. Further, in some embodiments, the second presentation data may include at least one second virtual object model corresponding to at least one second virtual object. Further, the generating of the second virtual object model may be independent of the first sensor data. Further, the storage device 706 may be configured for storing the second virtual object model.

FIG. 8 shows the corrected augmented reality view 800. Further, the augmented reality view 800 may include a road drawn in the sky (such as the skyway 806) indicating a path that a civilian aircraft 804 may take in order to land at an airport. Further, the augmented reality view 800 may include the navigation marker 808 indicating to a pilot 802 that the civilian aircraft 804 should take a left turn. The navigation marker 808 may assist the pilot 802 in navigating towards a landing strip to land the civilian aircraft 804.

Therefore, the corrected augmented reality view 800 may provide pilots with a similar view as seen by public transport drivers (e.g. taxi or bus) on the ground. The pilots (such as the pilot 802) may see roads (such as the skyway 806) that the pilot 802 needs to drive on. Further, the pilot 802, in an instance, may see signs just like a taxi driver who may just look out of a window and see road signs.

Further, the corrected augmented reality view 800 may include (but not limited to) one or more of skyways (such the skyway 806), navigation markers (such as the navigation marker 808), virtual tunnels, weather information, an air corridor, speed, signboards for precautions, airspace class, one or more parameters shown on a conventional horizontal situation indicator (HSI) etc. The skyways may indicate a path that an aircraft (such as the civilian aircraft 804) should take. The skyways may appear similar to roads on the ground. The navigation markers may be similar to regulatory road signs used on the roads on the ground. Further, the navigation markers may instruct pilots (such as the pilot 802) on what they must or should do (or not do) under a given set of circumstances. Further, the navigation markers may be used to reinforce air-traffic laws, regulations or requirements which apply either at all times or at specified times or places upon a flight path. For example, the navigation markers may include one or more of a left curve ahead sign, a right curve ahead sign, a keep left sign, and a keep to right sign. Further, the virtual tunnels may appear similar to tunnels on roads on the ground. The pilot 802 may be required to fly the aircraft through the virtual tunnel. Further, the weather information may include real-time weather data that affects flying conditions. For example, the weather information may include information related to one or more of wind speed, gust, and direction; variable wind direction; visibility, and variable visibility; temperature; precipitation; and cloud cover. Further, the air corridor may indicate an air route along which the aircraft is allowed to fly, especially when the aircraft is over a foreign country. Further, the corrected augmented reality view 800 may include speed information. The speed information may include one or more of a current speed, a ground speed, and a recommended speed. The signboards for precautions may be related to warnings shown to the pilot 802. The one or more parameters shown on a conventional horizontal situation indicator (HSI) include NAV warning flag, lubber line, compass warning flag, course select pointer, TO/FROM indicator, glideslope deviation scale, heading select knob, compass card, course deviation scale, course select knob, course deviation bar (CDI), symbolic aircraft, dual glideslope pointers, and heading select bug.

Further, in some embodiments, information such as altitude, attitude, airspeed, the rate of climb, heading, autopilot and auto-throttle engagement status, flight director modes and approach status etc. that may be displayed on a conventional primary flight display may also be displayed in the corrected augmented reality view 800.

Further, in some embodiments, the corrected augmented reality view 800 may include one or more of other vehicles (such as another airplane 810). Further, the one or more other vehicles, in an instance, may include one or more live vehicles (such as representing real pilots flying real aircraft), one or more virtual vehicles (such as representing real people on the ground, flying virtual aircraft), and one or more constructed vehicles (such as representing aircraft generated and controlled using computer graphics and processing systems).

In some embodiments, a special use airspace class may be determined. The special use airspace class may include alert areas, warning areas, restricted areas, prohibited airspace, military operation area, national security area, controlled firing areas etc. For an instance, if an aircraft (such as the civilian aircraft 804) enters a prohibited area by mistake, then a notification may be displayed in the corrected augmented reality view 800. Accordingly, the pilot 802 may reroute the aircraft towards a permitted airspace.

Further, the corrected augmented reality view 800 may include one or more live aircraft (representing real pilots flying real aircraft), one or more virtual aircraft (representing real people on the ground, flying virtual aircraft) and one or more constructed aircraft (representing aircraft generated and controlled using computer graphics and processing systems). Further, the corrected augmented reality view 800 shown to a pilot (such as the pilot 802) in a first aircraft (such as the civilian aircraft 804) may be modified based on sensor data received from another aircraft (such as another airplane). The sensor data may include data received from one or more internal sensors to track and localize the pilot's head within the cockpit of the aircraft. Further, the sensor data may include data received from one or more external sensors to track the position and orientation of the aircraft. Further, the data received from the one or more internal sensors and the one or more external sensors may be combined to provide a highly usable augmented reality solution in a fast-moving environment.

FIG. 9 shows an augmented reality view 900 shown to a real pilot while a civilian aircraft 902 is taxiing at an airport, in accordance with an exemplary embodiment. The augmented reality view 900 may include one or more navigational markers (such as the navigation marker 808) and signboards (such as a signboard 904) that assist a pilot to taxi the civilian aircraft 902 at the airport. The navigational markers may indicate the direction of movement. The signboards may indicate the speed limits.

The augmented reality view 900 may help the pilot to taxi the civilian aircraft 902 towards a parking location after landing. Further, augmented reality view 900 may help the pilot to taxi the civilian aircraft 902 towards a runway for take-off. Therefore, a ground crew may no longer be required to instruct the pilot while taxiing the civilian aircraft 902 at the airport.

Further, the augmented reality view 900 may include one or more live aircraft (such as a live aircraft 906) at the airport (representing real pilots in real aircraft), one or more virtual aircraft at the airport (representing real people on the ground, controlling a virtual aircraft) and one or more constructed aircraft at the airport (representing aircraft generated and controlled using computer graphics and processing systems). Further, the augmented reality view 900 shown to a pilot in a first aircraft may be modified based on sensor data received from another aircraft. The sensor data may include data received from one or more internal sensors to track and localize the pilot's head within the cockpit of the aircraft. Further, the sensor data may include data received from one or more external sensors to track the position and orientation of the aircraft. Further, the data received from the one or more internal sensors and the one or more external sensors may be combined to provide a highly usable augmented reality solution in a fast-moving environment.

In accordance with exemplary and non-limiting embodiments, the process of acquiring sensor information from one or more vehicles, maintaining a repository of data describing various real and virtual platforms and environments, and generating presentation data may be distributed among various platforms and among a plurality of processors.

Figure 10:
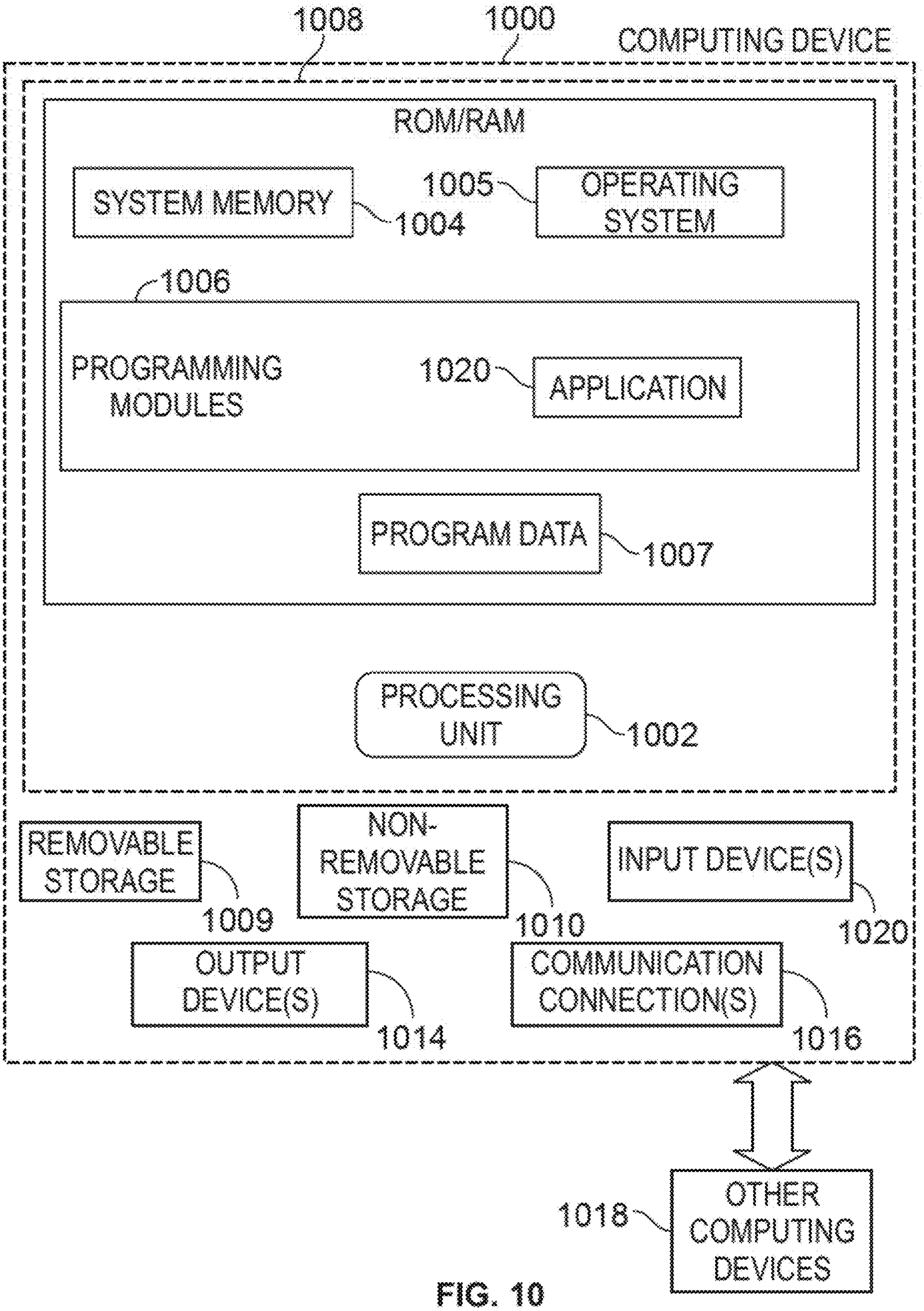
FIG. 10 is a block diagram of a computing device for implementing the methods disclosed herein, in accordance with some embodiments.

With reference to FIG. 10, a system consistent with an embodiment of the disclosure may include a computing device or cloud service, such as computing device 1000. In a basic configuration, computing device 1000 may include at least one processing unit 1002 and a system memory 1004. Depending on the configuration and type of computing device, system memory 1004 may include, but is not limited to, volatile (e.g. random-access memory (RAM)), non-volatile (e.g. read-only memory (ROM)), flash memory, or any combination. System memory 1004 may include operating system 1005, one or more programming modules 1006, and may include a program data 1007. Operating system 1005, for example, may be suitable for controlling computing device 1000's operation. In one embodiment, programming modules 1006 may include image-processing module, machine learning module and/or image classifying module. Furthermore, embodiments of the disclosure may be practiced in conjunction with a graphics library, other operating systems, or any other application program and is not limited to any particular application or system. This basic configuration is illustrated in FIG. 10 by those components within a dashed line 1008.

Computing device 1000 may have additional features or functionality. For example, computing device 1000 may also include additional data storage devices (removable and/or non-removable) such as, for example, magnetic disks, optical disks, or tape. Such additional storage is illustrated in FIG. 10 by a removable storage 1009 and a non-removable storage 1010. Computer storage media may include volatile and nonvolatile, removable and non-removable media implemented in any method or technology for storage of information, such as computer-readable instructions, data structures, program modules, or other data. System memory 1004, removable storage 1009, and non-removable storage 1010 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1000. Any such computer storage media may be part of device 1000. Computing device 1000 may also have input device(s) 1012 such as a keyboard, a mouse, a pen, a sound input device, a touch input device, a location sensor, a camera, a biometric sensor, etc. Output device(s) 1014 such as a display, speakers, a printer, etc. may also be included. The aforementioned devices are examples and others may be used.

Computing device 1000 may also contain a communication connection 1016 that may allow device 1000 to communicate with other computing devices 1018, such as over a network in a distributed computing environment, for example, an intranet or the Internet. Communication connection 1016 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1004, including operating system 1005. While executing on processing unit 1002, programming modules 1006 (e.g., application 1020 such as a media player) may perform processes including, for example, one or more stages of methods, algorithms, systems, applications, servers, databases as described above. The aforementioned process is an example, and processing unit 1002 may perform other processes. Other programming modules that may be used in accordance with embodiments of the present disclosure may include sound encoding/decoding applications, machine learning application, acoustic classifiers etc.

In accordance with exemplary and non-limiting embodiments, the system may operate to project to a pilot alternative training environments. In some instances, described below, doing so may afford a greater degree of safety than experienced when interacting with physical objects.

For example, carrier landings are amongst the most difficult landings to perform as the landing area on the deck of the carrier is often times pitching and/or rolling. Further, the requirement to catch a wire with a tailhook extending from the aircraft allows little room for error. There therefore exists a need to simulate a carrier landing or landing on another physical runway.

Accordingly, in embodiments, a naval environment incorporating a carrier and/or carrier group may be projected into space at an elevation well above ground level. For example, the surface of the ocean and a carrier afloat in the ocean may be projected at an elevation of 15,000 feet to a pilot attempting to land on the virtual carrier and who is flying at an elevation of 16,000 feet. In the present example, the system may operate in an augmented reality mode to project the carrier deck as the aircraft approaches as it would appear to the pilot were the carrier at sea level.

During the approach, the system may operate, either in an automated mode or via human interaction, to provide the pilot with required information via a virtual optical landing system (OLS). An OLS is used to give glidepath information to pilots in the terminal phase of landing on an aircraft carrier. In such instances, the landing may commence in a virtual manner up until the point at which the aircraft's tailhook catches the restraining wire. In some embodiments, the system may provide feedback to the pilot to indicate a successful landing. For example, the system may provide haptic feedback such as, for example, causing the pilot's seat or helmet to vibrate. In other instances, an audio tone may be emitted to the pilot to signal either a successful or unsuccessful landing. In an embodiment, an augmented reality visual indication of the landing may be indicated. The ability to interject day/night, low visibility and all types of weather conditions through Augmented Reality exists, thus enabling the pilots the most immersive experience they will encounter in actual conditions.

Upon signaling the status of the landing attempt, the system may cease to display any or all of the virtual content representing the carrier scenario to the pilot. In some embodiments, the virtual carrier imagery may be projected and viewed to each of a plurality of aircraft engaged in a joint exercise. For example, the system may operate to allow multiple aircraft to engage in the simulated task of landing on a carrier deck after completing a mission, referred to as aircraft "recovery". In some instances, for example, when the lead aircraft successfully progresses to a determination of a landing on the virtual flight deck, the other aircraft yet to land may be provided virtual content showing the previous aircraft has cleared the landing area. At approximately the same time, the aircraft corresponding to the simulated landed aircraft proceeds such that the virtual carrier environment disappears from view leaving the aircraft's pilot to view his surrounding environment free of the simulated carrier attributes.

In some embodiments, if an aircraft fails to successfully land the aircraft on the simulated environment, the system may display content to the other aircraft indicative of a "fouled deck", emergency scenario, etc. This would provide the pilot further situational awareness in addition to coordination with the ship's LSO (Landing Signal Officer). As a result, pilots gain experience aborting a landing in the instance that a preceding aircraft experienced a landing failure.

In some embodiments, the virtual content of catapult launch can be accomplished giving the pilots the experience of "launching" from the deck at 60' feet above the water. As in the landing scenario, the dynamics of pitch, roll, heave, sway, in addition to day/night and weather conditions can be manipulated enabling the pilots the most immersive experience during a critical phase of flight. Furthermore, the technology could represent training that would be impossible to experience and replicate real time when it comes to emergencies off the catapult "stroke". Particularly engine failures which can be simulated under various conditions (for example, with varying gross weight) giving the pilot the ability to recognize when they might have to eject, or if they are able to maintain flyability.

In some embodiments, the virtual content comprising the carrier and surrounding water may be reduced in scope to include only a relatively short distance beyond the carrier. In such instances, the carrier is clearly visibly set off by a surrounding portion of ocean but allowing for the pilot to see the unobstructed environment around and beyond the carrier. Such a scenario reduces the risk of descending near to a physical object flying or operating under the virtually displayed sea level as well as providing an awareness of the true ground level while engaging in the simulation.

In yet other embodiments, virtual content may be displayed in a similar manner comprising one or more naval assets floating upon a virtual sea and projected at a substantial altitude. A pilot may interact with the virtual objects as projected virtual content in a simulated combat scenario. Examples include strafing surface vessels, dropping depth charges, etc.

In accordance with other exemplary embodiments, the system may operate to enable a pilot or pilots, such as flying in formation, to simulate a mission flown amongst physical barriers with small margins of error. For example, in order to avoid radar detection, aircraft may fly low over rough terrain to reach a target. The contours of the terrain comprising, for example, canyons and the like, may require a series of changes in elevation and abrupt changes in direction and velocity on the part of the aircraft in order to maintain close proximity to the terrain.

In some embodiments, as with the carrier example discussed above, the terrain may be displayed in the XR helmet of a pilot. For example, if the terrain over which a pilot is to practice flying extends for fifty miles and experiences a change in elevation of 2000 feet, the system may display the terrain with the lowest part of the terrain appearing at 20,000 feet in the air and extending up to 22,000 feet. As a result, a physical aircraft may simulate flying through the projected terrain while never actually flying below 20,000 feet.

An aspect of the present invention relates to providing guidance to a pilot of an airplane during low visibility situations. As disclosed herein elsewhere, a plane and pilot's position and pose may be tracked and mapped into a virtual 3D space which is mapped to actual geospatial coordinates to assist in the presentation of mixed reality content to the pilot. Mixed reality navigation guidance content may be generated and presented to a pilot using similar technologies. The navigation guidance content may represent a landing area, another airplane, another vehicle, etc. For example, if a pilot is attempting to land on an aircraft carrier, a three-dimensional digital representation of the carrier may be presented as mixed reality content where the content is mapped within the virtual space such that it represents an actual position of the aircraft carrier. Data regarding the carrier's position, speed, pose, etc. may be continually tracked and used to update the information in the virtual space. This allows the relative tracking between the pilot and the carrier based on absolute geospatial coordinates. Creating a mixed reality content that is represented at the proper location in both absolute geospatial terms and relative terms to the pilot is very important when the pilot is using the content as a navigation guide. This embodiment illustrates how a pilot may be able to 'see' the carrier even though the visibility is bad. It may appear to be a white out situation by the naked eye, but the mixed reality content, sized and positioned accurately, provides the pilot with a realistic view of what he cannot otherwise see.

Figure 11:
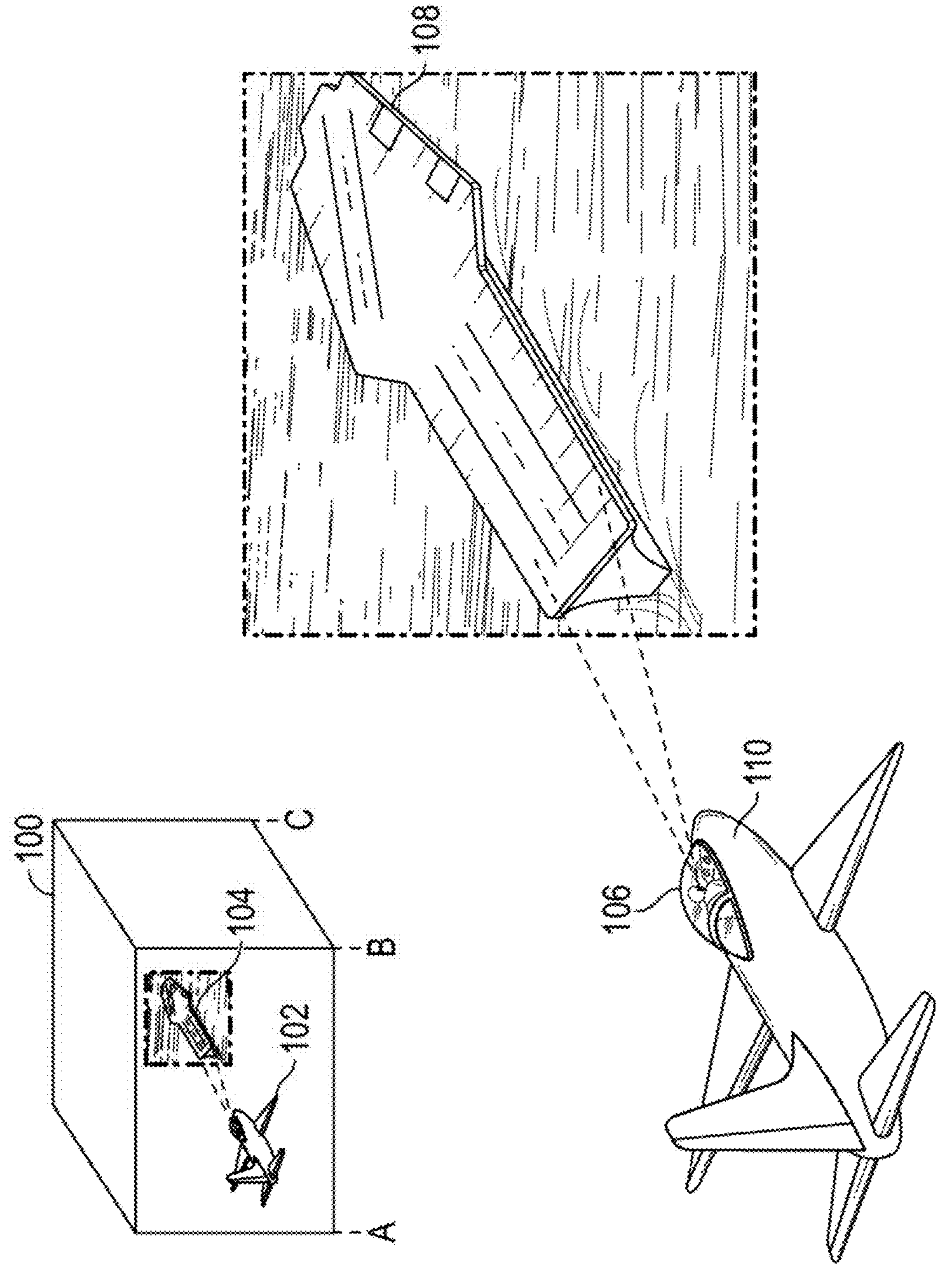
FIG. 11 shows a virtual aircraft and virtual carrier are located within virtual space.

With reference to FIG. 11, there is illustrated a real airplane 1110 with a real pilot 1106 during an AR training exercise. The exercise involves presenting AR content, in this case in the form of an aircraft carrier 1108, on a see-through display in the airplane 1110 such that the pilot 1106 perceives that there is an aircraft carrier 1108 in his view. As discussed elsewhere herein, the AR representation of the aircraft carrier 1108 changes position within a field-of-view of the see-through display based on a number of factors (e.g., plane position, plane attitude, pilot head position, geospatial position of the aircraft carrier AR content). In embodiments, the geospatial position of the aircraft carrier is high in the air such that the pilot 1106 can practice landing on a virtual deck of the AR aircraft carrier 1108 without the dangers of doing so close to the water or on a real ship. For example, the geospatial position of the AR aircraft carrier 1108 might be 5,000 feet above sea level. The pilot may then fly nearby the geospatial location of the AR aircraft carrier 1108, above 5000 feet so he is flying in the airspace above the AR aircraft carrier 1108 and make a landing attempt. Success of the landing attempt may be measured by performance attributes such as the speed of the airplane 1110 when the plane intersects with the deck's position, where on the deck the airplane 1110 landed, the angle of decent of the plane when it intersects the deck, etc. As discussed herein elsewhere, the success of the landing can be signaled to the pilot in various ways such as by sound or vibration.

FIG. 11 also illustrates a multi-dimensional (e.g., 3D, 3D over time) computer model 1100. The computer model may be included within a gaming engine (e.g., Unreal Engine® from Epic Games®) where virtual content can be positioned, controlled and programmed to interact with other virtual content. In embodiments, data representing a geospatial position of the real airplane 1110, along with data indicative of its pose (attitude), pilot helmet position, etc., can be mapped into the computer model. The airplane 1110 can thus be tracked within the computer model 1100 as airplane object 1102. The gaming engine may also be used to introduce and control a virtual representation of the aircraft carrier 1108, presented within the computer model as aircraft carrier object 1104. The aircraft carrier object 1104 may be a generated and controlled by the gaming engine. In this embodiment, the airplane object 1102 is not controlled by the gaming engine but, rather, is based on data received from sensors on the airplane and tracked by the gaming engine within the computer model.

In this embodiment, with both the airplane object 1102 and the aircraft carrier object 1104 being tracked and/or controlled within the multi-dimensional model, calculations of the relationships between the two can be made. For example, a line-of-sight calculation can be made to determine a line-of-sight between the pilot's head position within the airplane object 1102, including pose of the airplane, and the aircraft carrier object 1104. The line-of-sight calculation can then be used to determine where, within a field-of-view of the see-through display, the AR content representative of the aircraft carrier 1108 should be positioned to represent properly the geospatial position of the aircraft carrier 1108 from the pilot's perspective.

Figure 12:
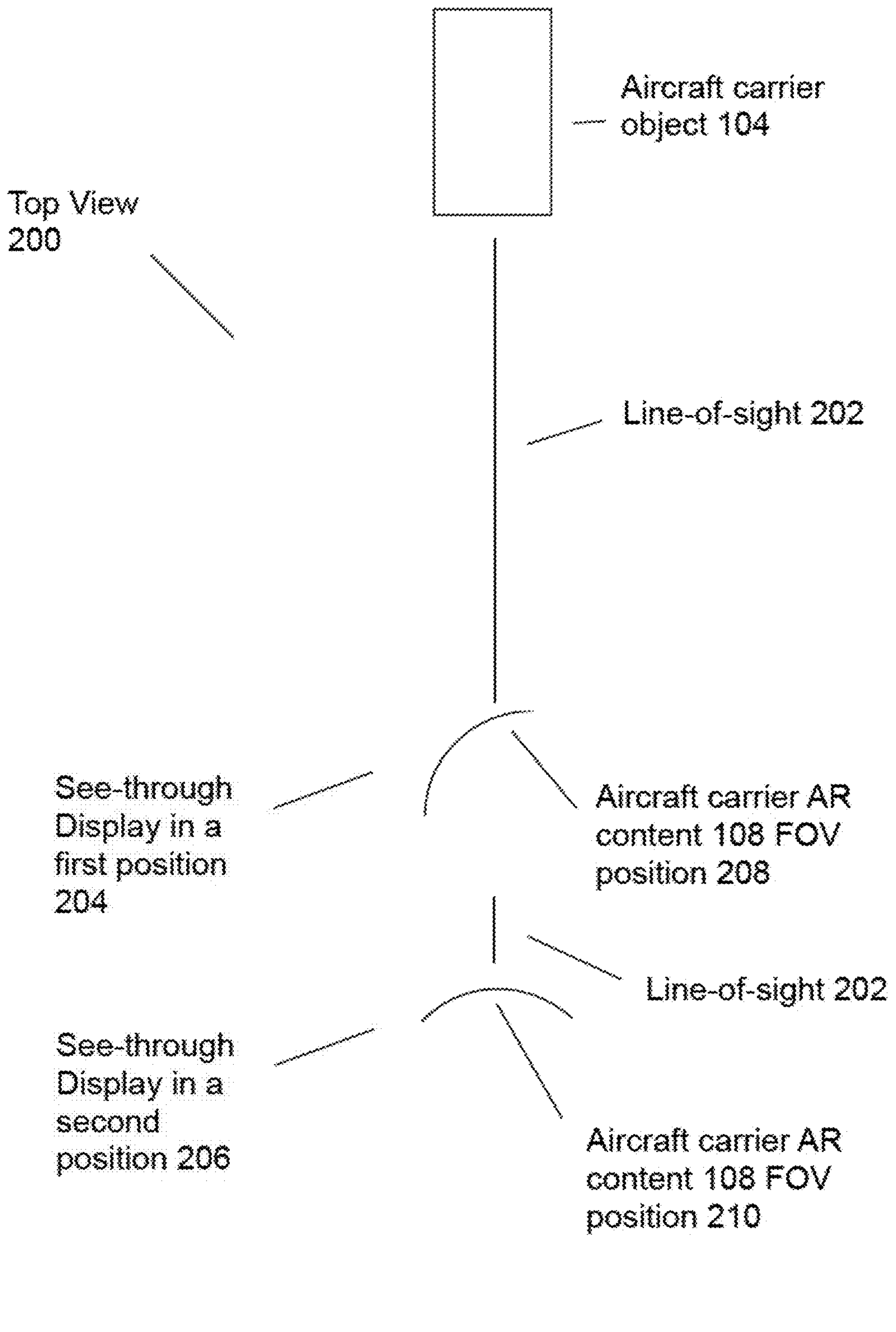
FIG. 12 shows a schematic of a line-of-sight calculation.

FIG. 12 is a schematic of a top view of a pilot's line-of-sight in approaching a virtual aircraft carrier landing deck. In this embodiment, a computer receives data on the position of the real airplane, pose of the real airplane, and position of the head of the pilot, and then calculates a relational position of the see-through display with its field-of view. FIG. 12 illustrates two separate positions of the see-through display, 1204 and 1206. To be clear, these positions are examples of a position of the see-through display at different times. A line-of-sight 1202 calculation can be made between the head of the pilot (e.g., center of the head, face) and the aircraft carrier object 104 within the computer model. The see-through display location and position may also be known as it relates to the pilot's head position. When the see-through display is turned to the left, as illustrated as element 1204, the line of sight intersects the field-of-view on the right side, so this intersection represents the position of that the AR content should be positioned 1208 such that it is perceived by the pilot as being at the geospatial location of the aircraft carrier 1104. Similarly, when the see-through display is facing forward, as illustrated by element 1206, the line-of-sight intersects the see-through display's field-of-view in the middle so the AR content representing the aircraft carrier 1108 should be placed in a middle position 1208. Although this is a two-dimensional illustration, it should be understood that given the pose of the airplane and head of the pilot, the field-of-view position calculation for the actual implementation will likely occur in three dimensions and change over time.

In one embodiment, the virtual content is based on third party data (TPD). As used herein, TPD is data collected or generated by an organization different from the party operating the claimed system or practicing the claimed method. In one embodiment, the system comprising an interface for receiving TPD from one or more sources. TPD can include data sets that are "stitched" together from a wide range of sources and come from governmental, for-profit, non-profit, or academic sources. For example, in one embodiment, the TPD comprises at least one of automatic dependent surveillance-broadcast (ADS-B), airborne warning and control system (AWACS) data, map/terrain data, weather data, airport ground traffic/taxiing data, jamming signal map/data, electromagnetic map data, or intelligence data, just to name a few. In one embodiment, TPD is combined. For example, in one embodiment, the map/terrain data may be combined with intelligence data to show the location of friendly or enemy assets within the map/terrain data.

In one embodiment, the TPD is received by the system of the present invention via an application program interface (API) or the system can receive the data via a standard data transfer protocol. Still other approaches for receiving TPD will be apparent to one of skill in the art in light of this disclosure.

The TPD is received by the system and is converted into an object of the virtual content for display. For example, in accordance with exemplary and non-limiting embodiments, the system may draw upon ADS-B data when displaying, for example, a skyway 806 or other graphic indicating geocoded data for the pilot to see. ADS-B data may be retrieved from a database, such as by a gaming engine adapted to create and transmit augmented reality data for display to a pilot. In this manner, ADS-B data may from a valuable resource from which may be derived data to be presented in augmented reality to a pilot.

For example, ADS-B data may indicate the presence of an aircraft flying 300 meters of the right wing of an aircraft 804. A gaming engine with access to the ADS-B database as well as the position information of an aircraft to which it is transmitting display data, may transmit data enabling the pilot 802 to see a virtual representation of the nearby aircraft in its proper position and orientation through their augmented reality helmet mounted display, heads up display, AR glasses or goggles or other display as disclosed herein. This is of particular use when the actual nearby aircraft is occluded, as by atmospheric conditions such as clouds or fog, or when the nearby aircraft is beyond visual range but still relevant to the pilot. For example, the nearby plane maybe 20 miles away from the AR enabled pilot and flying on a course to come close or intersect with the AR enabled plane. AR content representing the nearby plane may be placed in the field of view of the pilot.

In some instances, ADS-B data may be utilized as described above to enhance a pilot's perception of nearby aircraft while still on the ground. In some embodiments, ADS-B data may be mined to determine instructions to other aircraft indicating expected future movements. For example, ADS-B data may be queried to receive a flight path indicative of a desired path to landing. The flight path may be presented in any manner conducive to depicting the future expected path to be taken by an aircraft. For example, a series of circles or tother geometric shapes forming a virtual tunnel or pathway through which the aircraft is to proceed may be displayed to the pilot.

In addition to the series of waypoints and positions displayed via the shapes to the pilot, information describing the flight path, such as desired airspeed and the like, ay be presented. In some instances, airspeed information may be displayed in a textual format floating in space. In other instances, the geometric shapes may be color coded to indicate desired speed. In other instances, the shapes may be color coded to express deviations from expected airspeed. For example, a series of green circles displayed and through which the pilot maneuvers his aircraft indicates that the pilot is on the proper course and at the proper speed. In instances where the airspeed is not optimal, as when a landing speed is too low, the circles may appear in shades of red or blue to indicate a problem.

In addition to displaying one's own flight path, ADS-B data may be used to display the flight paths of other aircraft. For example, the flight path of another aircraft that passed through the same landing corridor previously may be shown, such as by using the same geometric shapes described above, but, perhaps, with varying color saturation to indicate how long ago the aircraft passed through the indicated flight path. By so doing, a pilot is alerted to the separation in time from other aircraft in the vicinity and may make a judgment as to the danger presented by other factors, such as, for example, wind shear.

In embodiments, data from the airplane indicative of its location, pose, speed, control surfaces, operator's head orientation and vision direction, etc. may be communicated to a game engine. The game engine may then associate the airplane data with a computer model of the airspace in which the airplane is operating. For example, the ADS-B data may also be communicated to the game engine, and it can be incorporated into the computer model of the airspace such that geometric associations between the ADS-B data points and the airplane data can be calculated and understood. For example, in one embodiment, a vector representing a distance and direction between the data representing the airplane and the ADS-B data is determined. The vector can then be used to calculate where in the pilot's AR field of view the content should be placed such that they perceive the content as representing the correct, or intended, position of the ADS-B information.

In other embodiment, map/terrain data from a third-party source is used for training purposes. For example, a terrain by be displayed as the object of the virtual content. The terrain may emulate the terrain to be encountered on an upcoming mission or possible target. But rather than having to navigate the real peaks and valleys of the terrain with catastrophic results for any mistake, the pilots may practice well above the ground in safe air space without risk of impacting the ground.

In yet another embodiment, the map/terrain data may be augmented with data from intelligence services to indicate, for example, the location of enemy assets, such as, for example, anti-aircraft sites.

These and other advantages may be realized in accordance with the specific embodiments described as well as other variations. It is to be understood that the above description is intended to be illustrative, and not restrictive. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

Although the invention has been explained in relation to its preferred embodiment, it is to be understood that many other possible modifications and variations can be made without departing from the spirit and scope of the invention.

These and other advantages may be realized in accordance with the specific embodiments described as well as other variations. It is to be understood that the above description is intended to be illustrative, and not restrictive. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

What is claimed is:

1. An augmented reality system for a pilot in a cockpit of an aircraft flying in a real airspace, said aircraft having a geospatial location and orientation in said real airspace at a given moment, said system comprising:

- a computer content presentation system for generating virtual airspace corresponding to said real airspace and at least one virtual object in said virtual airspace, said virtual object having a geospatial location in said virtual airspace, said virtual object's geospatial location in said virtual airspace being independent of said aircraft's geospatial location in said real airspace;
- a screen through which said pilot has a field of view of said real airspace outside of said aircraft;
- a display configured to cause virtual content comprising an image of a portion of said virtual airspace corresponding to said field of view of said real airspace to overlay said field of view of said real airspace, wherein said virtual object is displayed based on its geospatial location in said virtual airspace independent of said geospatial location of said aircraft in said real airspace such that said view shows said virtual object from a perspective consistent with said aircraft's geospatial location and orientation in said real airspace; and wherein said computer content presentation system is configured to receive a plurality of ADS-B data points from a source external to said augmented reality system, each ADS-B data point corresponding to a real aircraft other than said aircraft in said real airspace;

wherein said computer content presentation system is configured to select, from the plurality of ADS-B data points, an ADS-B data point corresponding to an aircraft relevant to the pilot based at least in part on a distance, direction, flight path, predicted proximity, or predicted intersection with said aircraft; and wherein said virtual object is based on the selected ADS-B data point.

2. The augmented reality system of claim 1, wherein said plurality of ADS-B data points is included in third party data comprising at least one of automatic dependent surveillance-broadcast (ADS-B), airborne warning and control system (AWACS) data, map/terrain data, weather data, taxiing data, intelligence data.

3. The augmented reality system of claim 1, wherein said virtual content comprises a speed of said virtual object, and an orientation of said virtual object at said geospatial location.

4. The system of claim 1, wherein said display comprises at least one of a head-mounted display (HMD), eyeglasses, Head-Up Display (HUD), smart contact lenses, a virtual retinal display, an eye tap, a Primary Flight Display (PFD) and a cockpit glass.

5. The augmented reality system of claim 4, wherein said display is a see-through display.

6. The augmented reality system of claim 5, wherein said system comprises a helmet worn by said pilot, said helmet comprising said display.

7. The augmented reality system of claim 6, further comprising a helmet position sensor system configured to determine a location and orientation of said helmet within said cockpit.

8. The augmented reality system of claim 7, wherein said virtual object representation is displayed on said display relative also to said location and orientation of said helmet in said cockpit.

9. The augmented reality system of claim 1, wherein the selected ADS-B data point comprises automatic dependent surveillance-broadcast data for a real aircraft other than said aircraft in said real airspace and represents at least a geospatial location of said real aircraft in said real airspace at said given moment.

10. The augmented reality system of claim 9, wherein said computer content presentation system is configured to create said virtual object in said virtual airspace as a virtual representation of said real aircraft, said virtual object's geospatial location in said virtual airspace corresponding to said geospatial location of said real aircraft in said real airspace represented by the selected ADS-B data point.

11. The augmented reality system of claim 10, wherein said computer content presentation system is configured to incorporate the selected ADS-B data point into a computer model of said virtual airspace, determine a vector representing distance and direction between said aircraft's geospatial location in said real airspace and said geospatial location of said real aircraft represented by the selected ADS-B data point, and determine, based on said vector, where in said field of view said virtual content including said virtual object should be placed so that said pilot perceives said virtual object as corresponding to said real aircraft in said real airspace.

12. The augmented reality system of claim 1, wherein the aircraft relevant to the pilot is beyond visual range of said pilot and is selected based at least in part on a flight path indicating that the aircraft relevant to the pilot is flying on a course to come close to or intersect with said aircraft.

13. A method of enhancing a view of a pilot using augmented reality, said pilot being in a cockpit of an aircraft flying in a real airspace, said pilot having a field of view of said real airspace outside of said aircraft through a screen, said aircraft having a geospatial location and orientation at a given moment in said real airspace, said method comprising:

generating virtual airspace corresponding to said real airspace;

receiving a plurality of ADS-B data points from a source external to an augmented reality system performing said method, each ADS-B data point corresponding to a real aircraft other than said aircraft in said real airspace;

selecting, from the plurality of ADS-B data points, an ADS-B data point corresponding to an aircraft relevant to the pilot based at least in part on a distance, direction, flight path, predicted proximity, or predicted intersection with said aircraft;

generating at least one virtual object in said virtual airspace, said virtual object having a geospatial location in said virtual airspace, said virtual object's geospatial location in said virtual airspace being independent of said aircraft's geospatial location in said real airspace, wherein said virtual object is based on the selected ADS-B data point;

causing, via a display, virtual content comprising an image of a portion of said virtual airspace corresponding to said field of view of said real airspace to overlay said field of view of said real airspace, wherein said virtual object is displayed based on its geospatial location in said virtual airspace independent of said geospatial location of said aircraft in said real airspace such that said view shows said virtual object from a perspective consistent with said aircraft's geospatial location and orientation in said real airspace.

14. The method of claim 13, wherein said plurality of ADS-B data points is included in third party data comprising at least one of automatic dependent surveillance-broadcast (ADS-B), airborne warning and control system (AWACS) data, map/terrain data, weather data, taxiing data, intelligence data.

15. The method of claim 13, wherein said virtual content comprises a speed of said virtual object, and an orientation of said virtual object at said geospatial location.

16. The method of claim 13, wherein said display comprises at least one of a head-mounted display (HMD), eyeglasses, Head-Up Display (HUD), smart contact lenses, a virtual retinal display, an eye tap, a Primary Flight Display (PFD) and a cockpit glass.

17. The method of claim 13, wherein the selected ADS-B data point comprises automatic dependent surveillance-broadcast data for a real aircraft other than said aircraft in said real airspace and represents at least a geospatial location of said real aircraft in said real airspace at said given moment.

18. The method of claim 17, wherein generating said at least one virtual object comprises creating said virtual object in said virtual airspace as a virtual representation of said real aircraft, said virtual object's geospatial location in said virtual airspace corresponding to said geospatial location of said real aircraft in said real airspace represented by the selected ADS-B data point.

19. The method of claim 18, further comprising incorporating the selected ADS-B data point into a computer model of said virtual airspace, determining a vector representing distance and direction between said aircraft's geospatial location in said real airspace and said geospatial location of said real aircraft represented by the selected ADS-B data point, and determining, based on said vector, where in said field of view said virtual content including said virtual object should be placed so that said pilot perceives said virtual object as corresponding to said real aircraft in said real airspace.

* * * * *